United States Patent
Reiderman et al.

(10) Patent No.: US 12,189,080 B2
(45) Date of Patent: Jan. 7, 2025

(54) DATA INVERSION TO REDUCE MOTION EFFECTS ON NUCLEAR MAGNETIC RESONANCE RELAXATION DATA

(71) Applicant: Halliburton Energy Services, Inc., Houston, TX (US)

(72) Inventors: Arcady Reiderman, Houston, TX (US); Rebecca Jachmann, Houston, TX (US); Jie Yang, Houston, TX (US); Songhua Chen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 352 days.

(21) Appl. No.: 17/751,828

(22) Filed: May 24, 2022

(65) Prior Publication Data

US 2023/0384472 A1    Nov. 30, 2023

(51) Int. Cl.
*G01V 3/32*    (2006.01)
*G01V 3/34*    (2006.01)

(52) U.S. Cl.
CPC . *G01V 3/32* (2013.01); *G01V 3/34* (2013.01)

(58) Field of Classification Search
None
See application file for complete search history.

(56) References Cited

U.S. PATENT DOCUMENTS

| | | | |
|---|---|---|---|
| 5,291,137 A * | 3/1994 | Freedman | G01V 3/32 324/303 |
| 5,486,762 A * | 1/1996 | Freedman | G01N 24/081 324/303 |
| 6,268,726 B1 | 7/2001 | Prammer et al. | |
| 6,297,632 B1 | 10/2001 | Speier | |

(Continued)

FOREIGN PATENT DOCUMENTS

EP    0977057 A2 *   2/2000

OTHER PUBLICATIONS

Foreign Communication from Related Application—International Search Report and Written Opinion of the International Searching Authority, International Application No. PCT/US2022/031579, dated Feb. 16, 2023, 11 pages.

(Continued)

*Primary Examiner* — Raul J Rios Russo
*Assistant Examiner* — Carl F. R. Tchatchouang
(74) *Attorney, Agent, or Firm* — Conley Rose, P.C.; Rodney B. Carroll

(57) ABSTRACT

A NMR tool for use in a wellbore in a subterranean region includes a magnet assembly to produce a magnetic field in a volume in the subterranean region; an antenna to produce an excitation in the volume, and to receive a plurality of spin echo waveforms from the volume; and a computing system coupled to the antenna and configured to: apply a first acquisition window having a first duration to the spin echo waveforms to generate a corresponding first echo train including a first plurality of NMR echo signal amplitudes; apply a second acquisition window having a second duration different than the first duration, to at least some of the spin echo waveforms to generate a corresponding second echo train including a second plurality of NMR echo signal amplitudes; and determine a relaxation parameter based on a single inversion of the first and second echo trains.

20 Claims, 14 Drawing Sheets

(56) References Cited

U.S. PATENT DOCUMENTS

| | | |
|---|---|---|
| 6,459,263 B2 | 10/2002 | Hawkes et al. |
| 6,566,874 B1 | 5/2003 | Speier et al. |
| 6,891,369 B2 | 5/2005 | Hurlimann et al. |
| 7,180,287 B2 | 2/2007 | Rottengatter et al. |
| 7,268,547 B2 | 9/2007 | Kruspe et al. |
| 7,339,374 B2 | 3/2008 | Blanz |
| 7,358,725 B2 | 4/2008 | Blanz |
| 8,941,383 B2 | 1/2015 | Hopper et al. |
| 10,429,536 B2 | 10/2019 | Kischkat et al. |
| 11,422,283 B1 * | 8/2022 | Reiderman .............. G01V 3/32 |
| 2003/0132749 A1 | 7/2003 | Speier et al. |
| 2005/0248342 A1 | 11/2005 | Rottengatter et al. |
| 2010/0134104 A1 | 6/2010 | Song et al. |
| 2015/0061664 A1 | 4/2015 | Reiderman et al. |
| 2016/0001855 A1 | 1/2016 | Liberg |
| 2016/0202384 A1 | 7/2016 | Utsuzawa et al. |
| 2019/0056524 A1 | 2/2019 | Reiderman |
| 2019/0346385 A1 | 11/2019 | Reiderman |
| 2020/0291763 A1 | 9/2020 | Utsuzawa et al. |
| 2021/0036300 A1 | 3/2021 | Li et al. |
| 2021/0062643 A1 | 3/2021 | Butler et al. |
| 2021/0157026 A1 | 5/2021 | Yang et al. |

OTHER PUBLICATIONS

Electronic Acknowledgment Receipt, Specification and Drawings for International Application No. PCT/US2022/31579, entitled "Data Inversion To Reduce Motion Effects On Nuclear Magneticresonance Relaxation Data," filed May 31, 2022, 50 pages.

Foreign Communication from Related Application—International Search Report and Written Opinion of the International Searching Authority, International Application No. PCT/US2021/42388, dated Apr. 13, 2022, 9 pages.

* cited by examiner

DATA INVERSION TO REDUCE MOTION EFFECTS ON NUCLEAR MAGNETIC RESONANCE RELAXATION DATA

TECHNICAL FIELD

This present disclosure relates generally to nuclear magnetic resonance (NMR) logging, for example for obtaining NMR data from a subterranean region. More specifically, this disclosure relates to a method and apparatus for NMR data acquisition and processing.

BACKGROUND

In the field of logging (e.g., wireline logging, logging while drilling (LWD) and measurement while drilling (MWD)), NMR tools are used to explore the subsurface based on the magnetic interactions with subsurface material. Some downhole NMR tools include a magnet assembly that produces a static magnetic field, and a coil assembly that generates radio frequency (RF) control signals and detects magnetic resonance phenomena in the subsurface material. Properties of the subsurface material can be identified from the detected phenomena. These properties may include estimates of the amounts of bound and free fluids, fluid types (e.g., oil, gas, and water), permeability, and other properties of interest.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
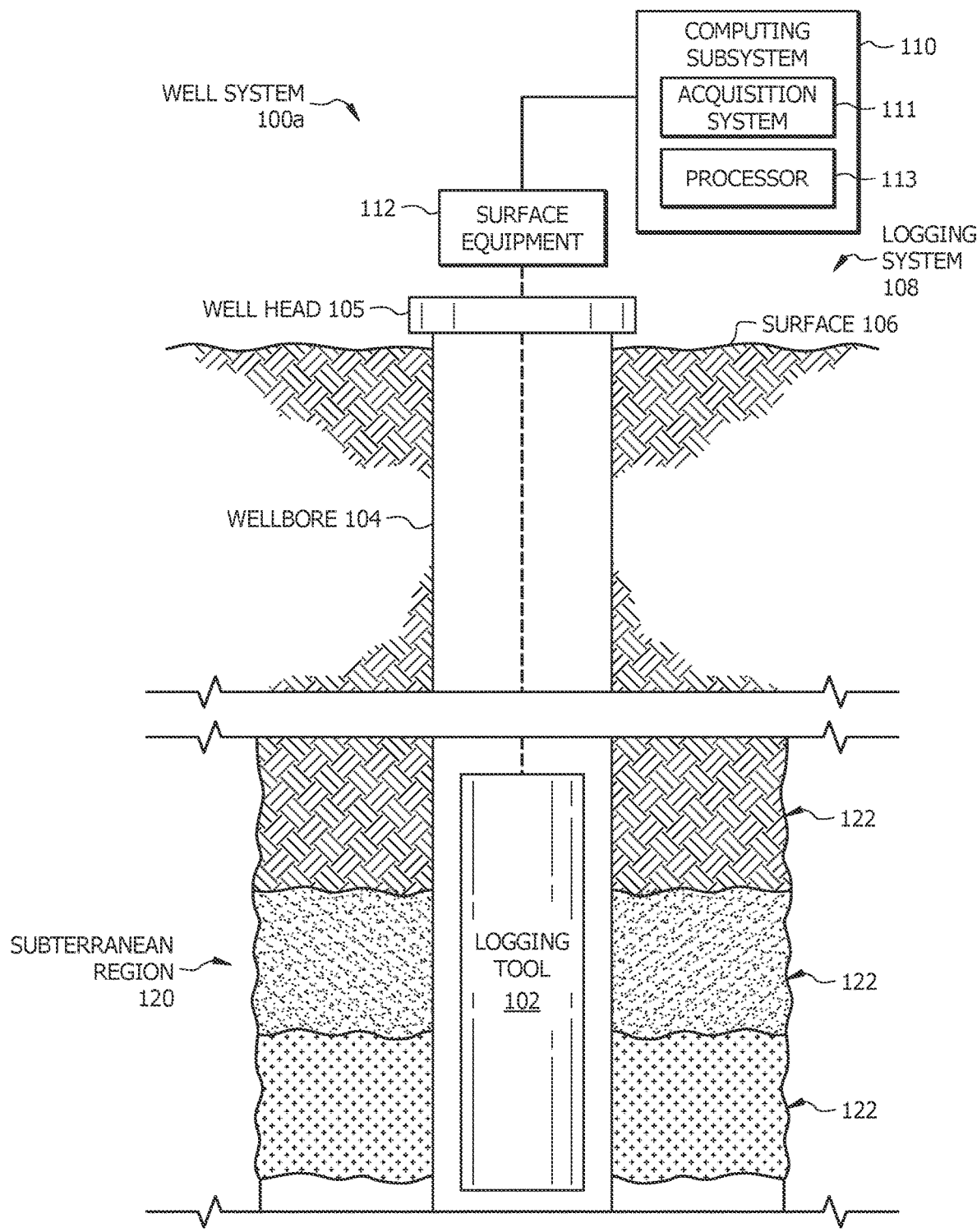
FIG. 1A is a diagram of an example well system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

NMR logging is possible because when an assembly of magnetic moments, such as those of hydrogen nuclei, are exposed to a static magnetic field they tend to align along the direction of the magnetic field, resulting in bulk magnetization. The rate at which equilibrium is established in such bulk magnetization upon provision of a static magnetic field is characterized by the parameter T1, referred to as the spin-lattice relaxation time. Another related NMR logging parameter is T2, referred to as the spin-spin relaxation time constant (also referred to as the transverse relaxation time), which is an expression of the relaxation due to nuclear spins dephasing. NMR logging has two main experiments in oil field downhole usage. The first experiment is to assess T1 buildup of magnetization, and the second experiment is to observe the decay of magnetization once it has been excited, in which the decay has a time constant of T2.

Measurement of T1 is indirect and is done by varying the polarization times after magnetization has, through some means, been nullified or inverted. For downhole observation, an NMR measurement technique, designed by Carr, Purcell, Meiboom, and Gill and, hence, referred to as CPMG, is used. It is considered a T2 measurement. CPMG has an excitation pulse followed by several refocusing pulses to counter the magnetic gradients in downhole NMR systems.

A T1 sequence is typically performed as: NullPulse—WaitTime—Excitation Pulse—Refocusing pulses. In some cases, the $T_1$ sequence has several different wait times. The number of refocusing pulses may be as few as 3 and as many as associated electronics are configured to handle (e.g., acquire and/or process). In some cases, the number of refocusing pulses is less than 2000.

The spin axes of the hydrogen nuclei in the earth formation are, in the aggregate, caused to be aligned with the magnetic field induced in the earth formation by a magnet. The NMR tool also includes an antenna positioned near the magnet and shaped so that a pulse of RF power conducted through the antenna induces a magnetic field in the earth formation orthogonal to the field induced by the magnet. A receiving antenna (which may be the same antenna as the one that generates the initial RF pulse) is electrically connected to a receiver, which detects and measures voltages induced in the receiving antenna by precessional motion of the spin axes of the nuclei.

As described, an NMR measurement involves a plurality of pulses grouped into pulse sequences, most frequently of a type known as CMPG pulsed spin echo sequences. Each CPMG sequence consists of a 90-degree (i.e., π/2) pulse, which may be an excitation pulse, followed by several refocusing pulses, which may be 180-degree (i.e., π) rotation pulses. The 90-degree pulse rotates the proton spins into the transverse plane and the refocusing pulses generate a sequence of spin echoes by refocusing the transverse magnetization after each spin echo.

NMR well logging data are sensitive to motion of the NMR tool. In an example in which the NMR tool is used in a LWD or MWD context, a lateral motion (e.g., vibration) and rotational movement of drilling operations may cause distortion of the NMR well logging data and, in some cases, an inability to acquire a spin echo signal representing transversal NMR relaxation (i.e., T2 relaxation).

While rotational sensitivity may be reduced by designing the NMR tool to be essentially axially symmetrical, the longitudinal and lateral displacement due to NMR tool motion (e.g., vibration), such as while drilling, remains problematic for NMR data acquisition in a LWD or MWD context.

To address the foregoing, disclosed herein are methods, assemblies, and systems that include an NMR tool for use in a wellbore in a subterranean region. In examples described herein, NMR signals may be acquired in the form of a plurality of spin echoes, where each spin echo comprises a waveform. In particular, the NMR tool includes an acquisition system that is configured to acquire an echo waveform from a volume in the subterranean region. The NMR tool (or the acquisition system thereof) is also configured to process each echo waveform into an NMR echo signal amplitude, such as by integrating the echo waveform over an acquisition window duration (and, optionally, applying a weighting function to the acquisition window). That is, each of the NMR echo signal amplitudes is provided by integrating the acquired spin echo waveform over an acquisition window (e.g., representing a time domain filter).

In various examples, an echo train or relaxation data refers to a plurality of NMR echo signal amplitudes that are related or associated by those amplitudes being determined using a same or substantially same acquisition window duration. In some cases, the NMR echo signal amplitude is influenced by a T2 relaxation component and, in some cases, a motion component. To reduce the influence of the motion component, in examples of this description, each echo waveform is processed into first and second NMR echo signal amplitudes. The first NMR echo signal amplitude is acquired or determined using a first acquisition window having a first duration, while the second NMR echo signal amplitude is acquired or determined using a second acquisition window having a second duration, which is different than the first duration. In some examples, additional NMR echo signal amplitudes are acquired or determined using additional (e.g., third and beyond) acquisition window(s) having additional (e.g., third and beyond) duration(s).

As explained further below, motion effects on the NMR tool are observable by comparing NMR echo signal amplitudes acquired or determined using acquisition windows having different durations. In a situation in which the NMR tool does not experience lateral motion, when the first and second NMR echo signal amplitudes are adjusted for their different acquisition window durations (e.g., normalized) to create normalized first and second NMR echo signal amplitudes, the normalized first and second NMR echo signal amplitudes are substantially coincident. However, in a situation in which the NMR tool experiences lateral motion, the normalized first and second NMR echo signal amplitudes are different. Thus, the effects of lateral motion on the NMR tool (e.g., a motion component of the NMR echo signal amplitude) are reflected in NMR echo signal amplitudes determined using different acquisition window durations. For example, the effects of lateral motion on the NMR tool may be identifiable or determinable by determining the first and second NMR echo signal amplitudes using different acquisition window durations. A first echo train (or relaxation data) includes a plurality of NMR echo signal amplitudes that are determined using the first acquisition window, and a second echo train (or relaxation data) includes a plurality of NMR echo signal amplitudes that are determined using the second acquisition window. In some examples, the NMR tool also includes a processor that is configured to perform data inversion using the first echo train (or relaxation data) and the second echo train (or relaxation data), which may be useful to determine a transversal relaxation spectra (e.g., T2) or other parameters related to spin relaxation times (e.g., T1-T2 two-dimensional relaxation spectrum) based on the NMR echo signal amplitudes determined using different acquisition window durations. As above, in some examples, a single inversion may be performed using additional (e.g., third and beyond) echo trains determined using additional acquisition window duration(s).

In an example, applying different acquisition window durations (or different bandwidths in frequency domain) to the spin echo waveforms results in NMR echo signal amplitudes containing differentiable information about lateral motion of the NMR tool. In at least some examples, the information about lateral motion is distinguishable from intrinsic relaxation (e.g., due to interactions of fluids and between fluid and a pore matrix in an earthen formation). A standard set of basis functions used to represent/invert NMR relaxation data (e.g., the first and second echo trains) is a set of exponential functions. In general, distortions of NMR relaxation data related to motion of the NMR tool render inadequate the set of basis functions to describe the distorted relaxation (e.g., including both intrinsic relaxation data attributed to formation fluids, and motion-induced apparent relaxation data). In some examples, new basis functions may be constructed based on simulation (e.g., analytical, numerical or experimental) of the NMR relaxation data (e.g., the first and second echo trains) when the NMR tool experiences motion. The new set of basis functions may use or otherwise leverage description/parameterization of the lateral motion of the NMR tool in some manner. For example, an accelerometer (e.g., coupled to the NMR tool) may provide data that provides insight to the motion of the NMR tool. These and other examples are described in further detail below, and with reference to the accompanying figures.

FIG. 1A is a diagram of an example well system 100a. The example well system 100a includes an NMR logging system 108 and a subterranean region 120 beneath the ground surface 106. A well system can include additional or different features that are not shown in FIG. 1A. For example, the well system 100a may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrated through the subsurface layers 122. The subsurface layers 122 can include sedimentary layers, rock layers, sand layers, or combinations of these and other types of subsurface layers.

One or more of the subsurface layers can contain fluids, such as brine, oil, gas, etc. Although the example wellbore 104 shown in FIG. 1A is a vertical wellbore, the NMR logging system 108 can be implemented in other wellbore orientations. For example, the NMR logging system 108 may be adapted for horizontal wellbores, slanted wellbores, curved wellbores, vertical wellbores, or combinations thereof.

The example NMR logging system 108 includes a logging tool 102 (also referred to herein as an NMR tool 102), surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, such as near the wellhead 105, to control the logging tool 102, and possibly to control other downhole equipment or other components of the well system 100. The example computing subsystem 110 is configured to receive and analyze logging data from the logging tool 102, such as described below in further detail. For example, the computing subsystem 110 may include at least an acquisition system 111 to acquire or receive data (e.g., from the logging tool 102) and a processor 113 to process the acquired or received data. The NMR logging system 108 may include additional or different features, and the features of the NMR logging system 108 may be arranged and operated as represented in FIG. 1A or in another manner.

In some instances, all or part of the computing subsystem 110 can be implemented as a component of, or can be integrated with one or more components of the surface equipment 112, the logging tool 102 or both. In some cases, the computing subsystem 110 can be implemented as one or more computing structures separate from the Surface equipment 112 and the logging tool 102.

In some implementations, the computing subsystem 110 is embedded in the logging tool 102, and the computing subsystem 110 and the logging tool 102 are configured to operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102, or integrated to the logging tool 102.

The well system 100a can include communication or telemetry equipment that enables communication among the computing subsystem 110, the logging tool 102, and other components of the NMR logging system 108. For example, the components of the NMR logging system 108 can each include one or more transceivers or similar apparatus for wired or wireless data communication among the various components. For example, the NMR logging system 108 can include systems and apparatus for optical telemetry, wireline telemetry, wired pipe telemetry, mud pulse telemetry, acoustic telemetry, electromagnetic telemetry, or a combination of these and other types of telemetry. In some cases, the logging tool 102 is configured to receive commands, status signals, or other types of information from the computing subsystem 110 or another source. In some cases, the computing subsystem 110 receives logging data, status signals, or other types of information from the logging tool 102 or another source.

The computing subsystem 110 may include a program memory that is configured to store executable instructions of one or more software programs corresponding to the functions described herein. The program memory may physically reside within computing subsystem 110 or at other computing resources accessible to computing subsystem 110, such as within the local memory resources of other memory devices and storage devices coupled to the computing subsystem 110, or within a server or other network-accessible memory resources accessible by the computing subsystem 110, or distributed among multiple locations. In any case, this program memory constitutes a non-transitory computer-readable medium that stores executable computer program instructions, according to which the operations described in this specification are carried out by computing subsystem 110, or by a server or other computer coupled to computing subsystem 110 (e.g., via network interfaces). The computer-executable software instructions corresponding to software programs to perform the functions described herein may have originally been stored on a removable or other non-volatile computer-readable storage medium (e.g., a DVD disk, flash memory, or the like), or downloadable as encoded information on an electromagnetic carrier signal, in the form of a software package from which the computer-executable software instructions were installed by computing subsystem 110 in the conventional manner for software installation. It is contemplated that those skilled in the art will be readily able to implement the storage and retrieval of the applicable data, program instructions, and other information useful in connection with this embodiment, in a suitable manner for each particular application, without undue experimentation.

In examples of this disclosure, NMR logging operations can be performed in connection with various types of downhole operations at various stages in the lifetime of a well system. Structural attributes and components of the surface equipment 112 and logging tool 102 can be adapted for various types of NMR logging operations. For example, NMR logging may be performed during drilling operations, during wireline logging operations, or in other contexts. Accordingly, the surface equipment 112 and the logging tool 102 may include, or may operate in connection with drilling equipment, wireline logging equipment, or other equipment for other types of operations. As another example, NMR logging may be performed in an offshore or subsea environment. Accordingly, the surface equipment 112 may be arranged on a drill ship or other offshore drilling vessel, and the logging tool 102 operates in connection with offshore drilling equipment, offshore wireline logging equipment, or other equipment for use with offshore operations.

Figure 2A:
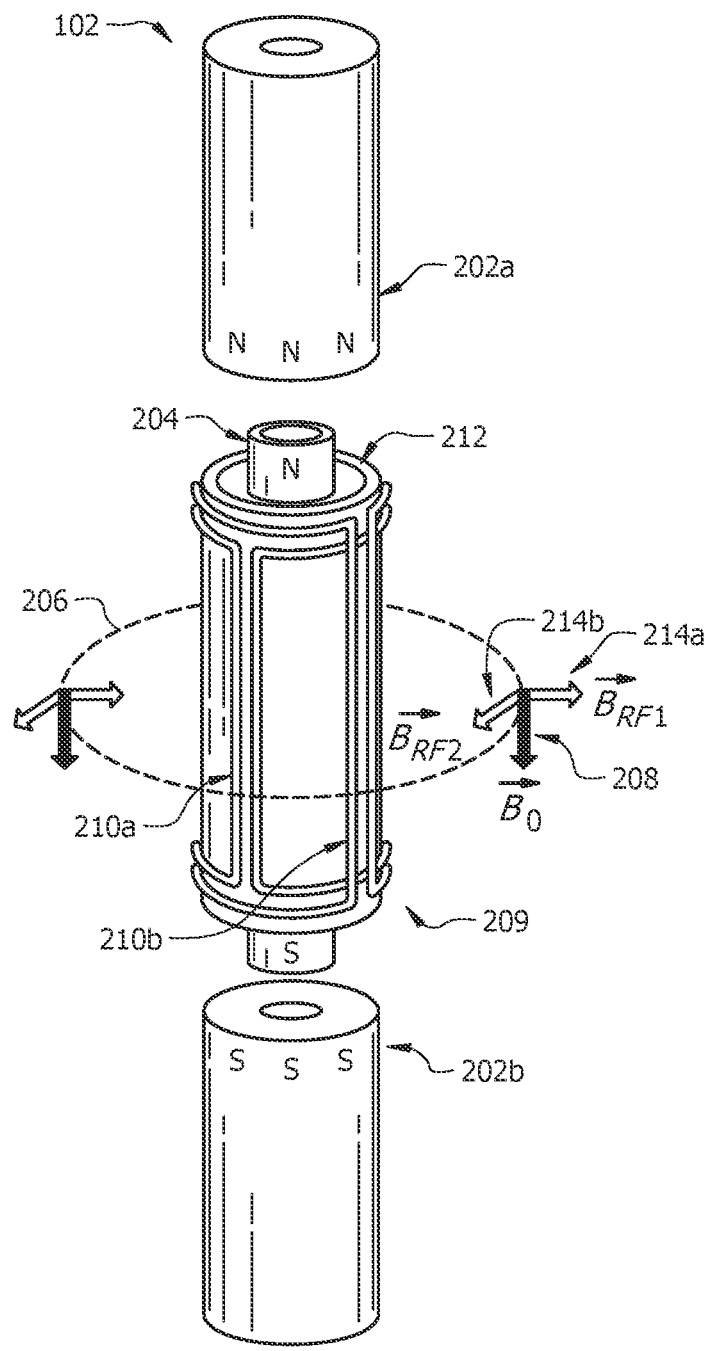
FIG. 2A is a diagram of an example downhole tool for obtaining NMR data from a subterranean region.

In some implementations, the logging tool 102 includes a magnet assembly that includes a central magnet and two end piece magnets. FIG. 2A shows an example of such a configuration, although the specific geometry and/or configuration of the logging tool 102 is not necessarily limited to that shown in FIG. 2A. In some examples, the end piece magnets are spaced apart from the axial ends of the central magnet. The end pieces together with the central magnets can define four magnetic poles, which may be arranged to enhance the static magnetic field in a volume of interest (e.g., including one or more of the subsurface layers 122 or portions thereof). The logging tool 102 can also include multiple orthogonal transversal-dipole antennas. The orthogonal transversal-dipole antennas can produce circular polarized excitation in a subterranean volume and acquire a response from the volume by quadrature coil detection.

Figure 1B:
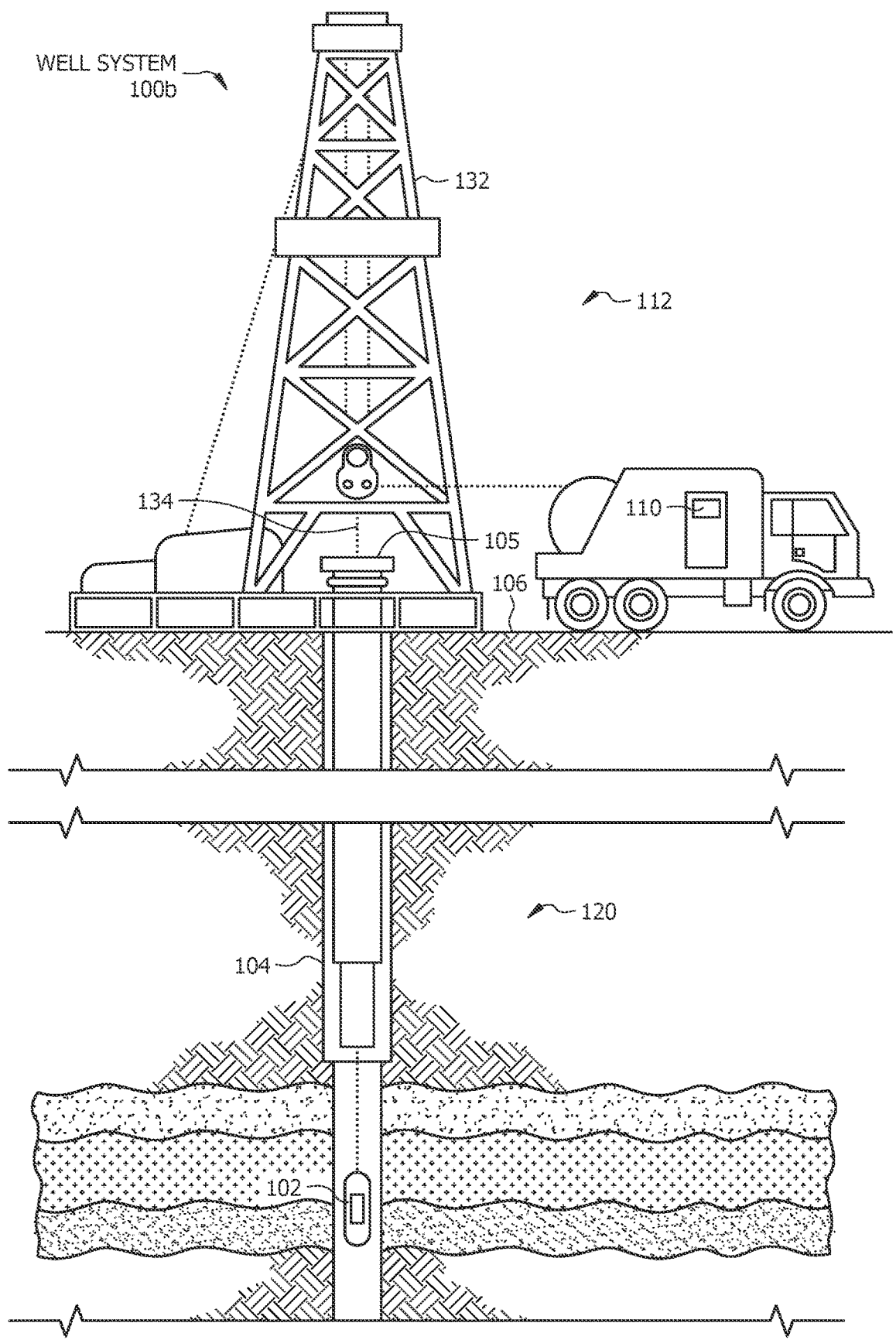
FIG. 1B is a diagram of an example well system that includes an NMR tool in a wireline logging environment.

In some examples, NMR logging operations are performed during wireline logging operations. FIG. 1B shows an example well system 100b that includes the logging tool 102 in a wireline logging environment. In some example wireline logging operations, the surface equipment 112 includes a platform above the surface 106 equipped with a derrick 132 that supports a wireline cable 134 that extends into the wellbore 104. Wireline logging operations can be performed, for example, after a drill string is removed from the wellbore 104, to allow the wireline logging tool 102 to be lowered by wireline or logging cable into the wellbore 104.

Figure 1C:
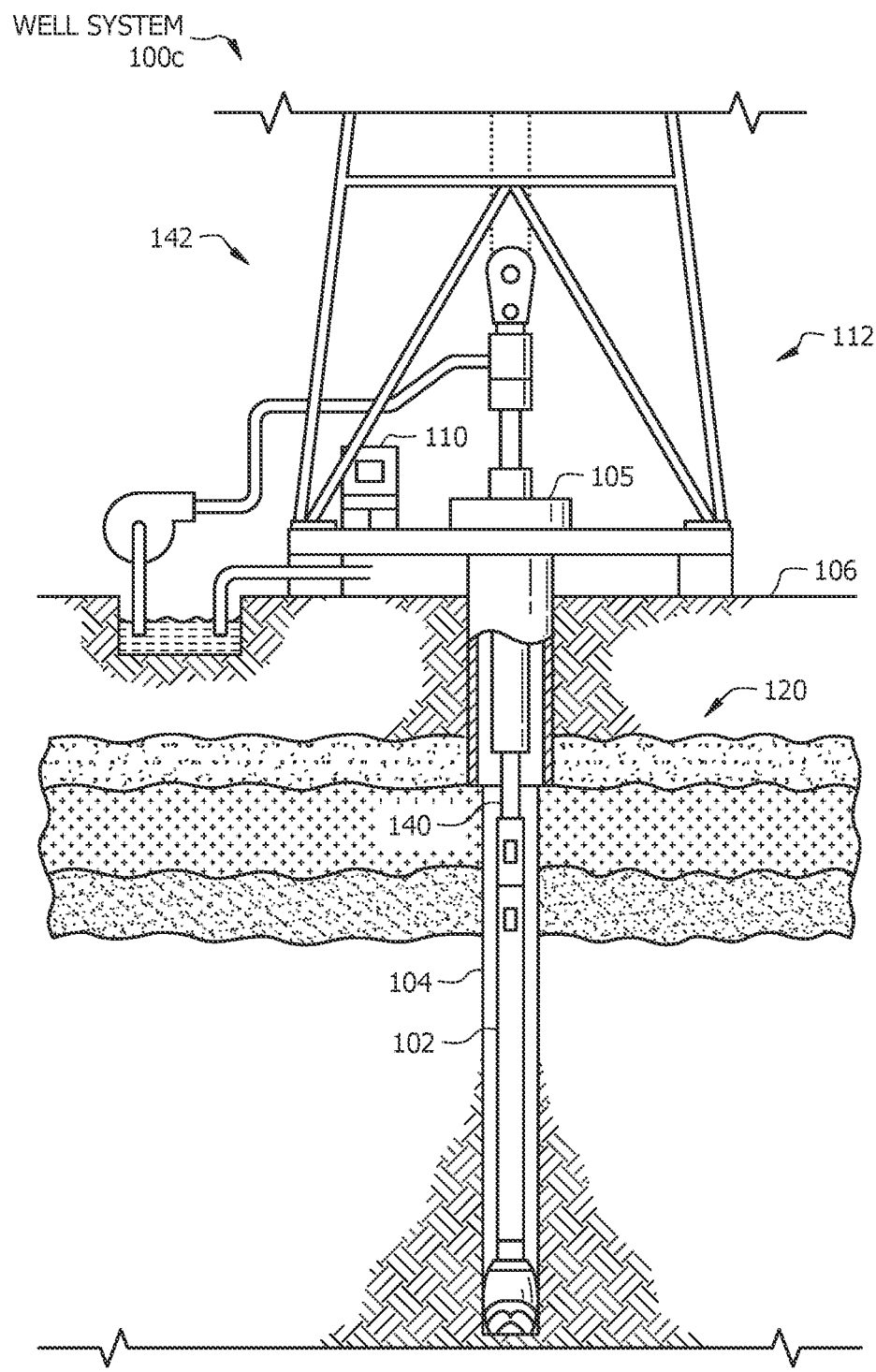
FIG. 1C is a diagram of an example well system that includes an NMR tool in an LWD environment.

In some examples, NMR logging operations are performed during drilling operations. FIG. 1C shows an example well system 100c that includes the logging tool 102 as an NMR tool 102 in a LWD/MWD environment. Drilling is commonly carried out using a string of drill pipes connected together to form a drill string 140 that is lowered through a rotary table into the wellbore 104. In some cases, a drilling rig 142 at the surface 106 supports the drill string 140, as the drill string 140 is operated to drill a wellbore penetrating the subterranean region 120. The drill string 140 may include, for example, a kelly, drill pipe, a bottomhole assembly, and other components. The bottomhole assembly on the drill string may include drill collars, drill bits, the NMR tool 102, and other components, including additional logging tools 102. The additional logging tools 102 may include MWD tools, LWD tools, and others.

In some implementations, the NMR tool 102 is configured to obtain NMR measurements from the subterranean region 120. As shown, for example, in FIG. 1B, the NMR tool 102 can be suspended in the well bore 104 by a coiled tubing, wireline cable, or another structure that connects the tool to a surface control unit or other components of the surface equipment 112. In some example implementations, the NMR tool 102 is lowered to the bottom of a region of interest and subsequently pulled upward (e.g., at a substantially constant speed) through the region of interest. As shown, for example, in FIG. 1C, the NMR tool 102 can be deployed in the wellbore 104 on jointed drill pipe, hard wired drill pipe, or other deployment hardware. In some example implementations, the NMR tool 102 collects data during drilling operations as it moves downward through the region of interest. In some example implementations, the NMR tool 102 collects data while the drill string 140 is moving, for example, while it is being tripped in or tripped out of the wellbore 104.

As explained above, NMR well logging data are sensitive to lateral (e.g., radial) motion of the NMR tool 102. In an example in which the NMR tool 102 is used in a LWD or MWD context such as in FIG. 1C, the lateral motion (e.g., vibration) and rotational movement of drilling operations may cause distortion of the NMR well logging data (e.g., due to the introduction of a motion component to the acquired NMR signal(s)) and, in some cases, an inability to acquire a spin echo signal representing transversal NMR relaxation, without such motion components. While rotational sensitivity may be reduced by designing the NMR tool 102 to be essentially axially symmetrical (e.g., as shown in FIG. 2A), the longitudinal and lateral displacement due to motion of the NMR tool 102 (e.g., vibration), such as while drilling, remains problematic for NMR data acquisition in a LWD or MWD context.

As explained further below, the acquisition system 111 of the computing subsystem 110 acquires first and second NMR signals from a volume in the subterranean region 120. The first NMR signal is acquired using a first acquisition window having a first duration, while the second NMR signal is acquired using a second acquisition window having a second duration, which is different than the first duration. Motion effects on the NMR tool 102 may be identifiable or determinable by determining the first and second NMR echo signal amplitudes (and thus first and second echo trains) using different acquisition window durations. For example, a plurality of spin echo waveforms are received from a volume being analyzed, and the computing system 110 (or the processor 113 thereof) is configured to apply a first acquisition window (having a first duration) to the plurality of spin echo waveforms to generate a first plurality of NMR echo signal amplitudes (e.g., a first echo train). The computing system 110 (or the processor 113 thereof) is also configured to apply a second acquisition window (having a second duration) to at least some of the plurality of spin echo waveforms to generate a second plurality of NMR echo signal amplitudes (e.g., a second echo train). A transversal relaxation spectra, or a relaxation parameter (e.g., a T2 parameter) may then be determined by performing a single inversion of both the first and second echo trains.

In some implementations, the NMR tool 102 collects data at discrete logging points in the wellbore 104. For example, the NMR tool 102 can move upward or downward incrementally to each logging point at a series of depths in the wellbore 104. At each logging point, instruments in the NMR tool 102 perform measurements on the subterranean region 120. The measurement data can be communicated to the computing subsystem 110 for storage, processing, and analysis. Such data may be gathered and analyzed during drilling operations (e.g., during LWD operations), during wireline logging operations, or during other types of activities.

The computing subsystem 110 is configured to receive and analyze the measurement data from the NMR tool 102 to detect properties of various subsurface layers 122.

In some implementations, the NMR tool 102 obtains NMR signals by polarizing nuclear spins in the subterranean region 120 and pulsing the nuclei with a radio frequency (RF) magnetic field. Various pulse sequences (i.e., series of radio frequency pulses, delays, and other operations) can be used to obtain NMR signals, including the CPMG sequence (in which the spins are first tipped using a tipping pulse followed by a series of refocusing pulses), the Optimized Refocusing Pulse Sequence (ORPS) (in which the refocusing pulses are less than 180°), a saturation refocusing pulse sequence, and other pulse sequences. The NMR tool 102 collects measurements relating to spin relaxation time (e.g., T1, T2) distributions as a function of depth or position in the borehole. The NMR tool 102 has a magnet, antenna, and supporting electronics. The permanent magnet in the tool causes the nuclear spins to build up into a cohesive magnetization. The T2 is measured through the decay of excited magnetization while T1 is measured by the buildup of magnetization.

The computing subsystem 110 is configured to process (e.g., invert, transform, etc.) the acquired spin echo signals (or other NMR data) to obtain an NMR signal, such as a relaxation-time distribution (e.g., a distribution of transverse relaxation times T2, or a distribution of longitudinal relaxation times T1, or both). For example, the acquired spin echo signals are integrated using acquisition windows having different durations to generate the different NMR signals, described above. The relaxation-time distribution can be used to determine various physical properties of the formation by solving one or more inverse problems. In some cases, relaxation-time distributions are acquired for multiple logging points and used by the computing system 110 to train a model of the subterranean region. In some cases, relaxation-time distributions are acquired for multiple logging points and used by the computing system 110 to predict properties of the subterranean region.

FIG. 2A is a diagram of an example of the NMR tool 102, described above. The example NMR tool 102 includes a magnet assembly that generates a static magnetic field to produce polarization, and an antenna assembly that generates a radio frequency (RF) magnetic field to excite nuclei and acquires NMR signals from the surrounding formation. In the example shown in FIG. 2A, the magnet assembly that includes the end piece magnets 202a, 202b and a central magnet 204 generates the static magnetic field in the volume of investigation 206. The poles of the central magnet 204 (e.g., north (N) and south(S)) face the like poles of the proximal end piece magnets 202a, 202b. The central magnet 204 is useful to shape and strengthen the static magnetic field in the volume of investigation 206. In this example, the volume of investigation 206 is approximately a cylindrical shell. In the volume of investigation 206, the direction of the static magnetic field (shown as the solid black arrow 208) is parallel to the longitudinal axis of the wellbore 104. In some examples, a magnet configuration with a bigger central magnet can be used to create a double pole strength and therefore increase the strength of the magnetic field (e.g., up to 100-150 Gauss or higher in some instances).

In the example shown in FIG. 2A, the antenna assembly 209 includes two mutually orthogonal transversal dipole antennas 210a, 210b. In some instances, the NMR tool 102 can be implemented with a single transversal-dipole antenna. For example, one of the transversal-dipole antennas 210a, 210b may be omitted from the antenna assembly 209. The example transversal-dipole antenna 210a, 210b shown in FIG. 2A are placed on an outer surface of a soft magnetic core 212, which is useful for RF magnetic flux concentration. The antenna assembly 209 generates two orthogonal RF magnetic fields 214a (e.g., produced by the antenna 210a) and 214b (e.g., produced by the antenna 210b). The two RF magnetic fields 214a, 214b have a phase shift of 90°. Accordingly, the magnetic fields 214a, 214b generate a circular polarized RF magnetic field to excite NMR in the surrounding formation more efficiently. It is also possible to only transmit with one antenna, even if a second antenna is included in the assembly. For example, the second antenna could be used only to receive NMR signals in this configuration. The same two antennas 210a, 210b are used to receive NMR signals from the surrounding formation. The received NMR signals are from induced currents from the NMR magnetization. The signals in the orthogonal antennas 210a, 210b, may then be processed (e.g., by the computing subsystem 110) together in order to increase a signal-to-noise ratio (SNR) of the acquired NMR data as described further below.

The static magnetic field can be axially symmetric (or substantially axially symmetric), and therefore the nuclear spins do not "see" a variable static magnetic field that would otherwise require broader band high power excitation associated with additional energy loss. The volume of investigation can be made axially long enough and thick enough (e.g., 15 cm long, and 1 cm thick) to provide immunity or otherwise decrease sensitivity to axial motion, lateral motion, or both. A longer sensitivity region may enable measurement while tripping the drill string 140. The sensitivity region can be shaped by shaping the magnets 202a, 202b, 204 and the soft magnetic material of the core 212.

In some implementations, the antenna assembly 209 additionally or alternatively includes an integrated coil set that performs the operations of the two transversal-dipole antennas 210a, 210b. For example, the integrated coil may be useful (e.g., instead of the two transversal-dipole antennas 210a, 210b) to produce circular polarization and perform quadrature coil detection. Examples of integrated coil sets that can be adapted to perform such operations include multi-coil or complex single-coil arrangements, such as, for example, birdcage coils used for high-field magnetic resonance imaging (MRI).

Compared to some example axially-symmetrical designs, the use of the longitudinal-dipole magnet and the transversal-dipole antenna assembly also has an advantage of less eddy current losses in the formation and drilling fluid (i.e., "mud") in the wellbore 104 due to a longer eddy current path than for some longitudinal-dipole antenna(s).

In some aspects, NMR measurements over multiple sub-volumes can increase the data density and therefore SNR per unit time. Multiple volume measurements in a static magnetic field having a radial gradient can be achieved, for example, by acquiring NMR data on a second frequency while waiting for nuclear magnetization to recover (e.g., after a CPMG pulse train) on a first frequency. A number of different frequencies can be used to run a multi-frequency NMR acquisition involving a number of excitation volumes with a different depth of investigation. In addition to higher SNR, the multi-frequency measurements can also enable profiling the fluid invasion in the wellbore, enabling a better assessment of permeability of earth formations. Another way to conduct multi-volume measurements is to use different regions of the magnet assembly to acquire an NMR signal. NMR measurements of these different regions can be run at the same time (e.g., simultaneously) or at different times.

Figure 2B:
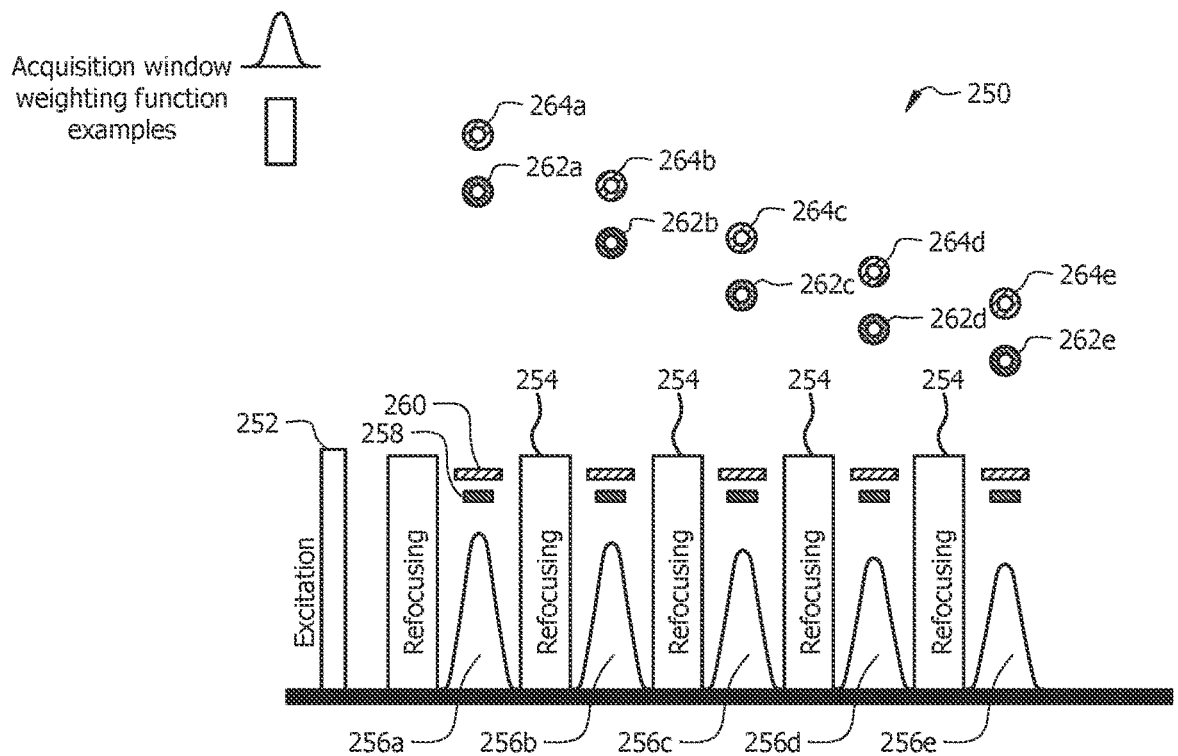
FIGS. 2B and 2C are graphs of waveforms of excitation and refocusing pulses provided by the downhole tool of FIG. 2A, and resulting spin echo waveforms and NMR echo signal amplitudes acquired and/or determined by the downhole tool of FIG. 2A, according to the disclosure.
Figure 2C:
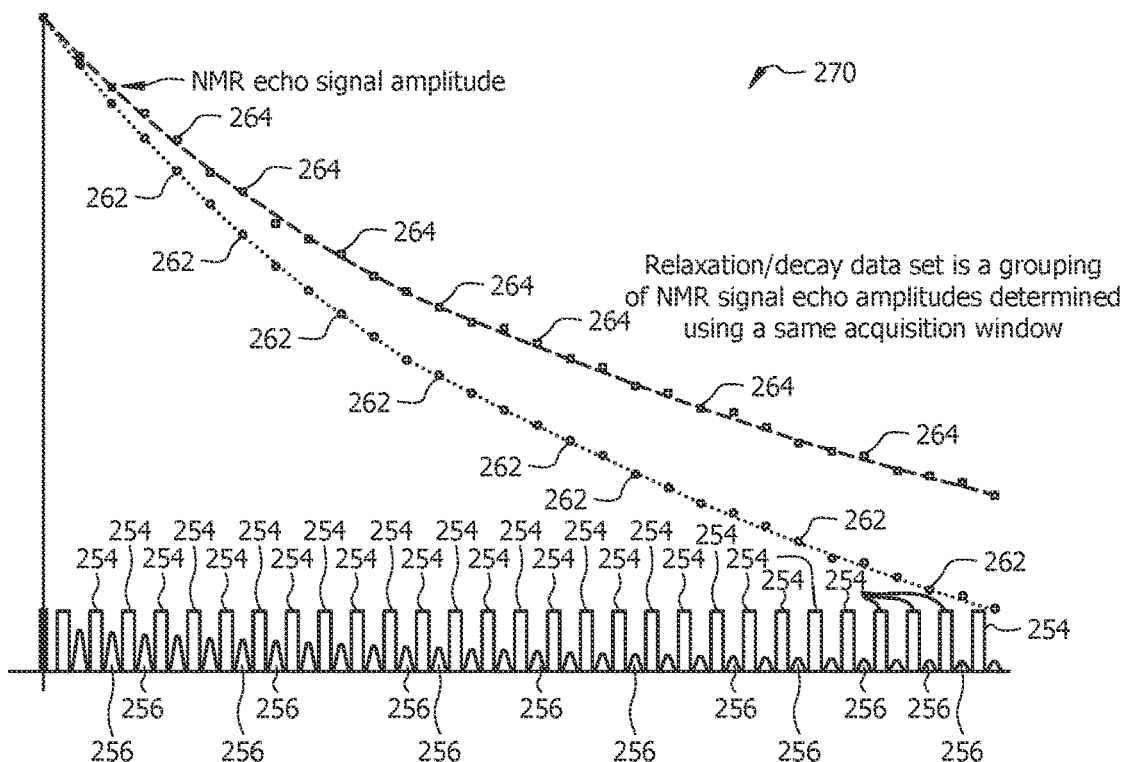

FIGS. 2B and 2C are graphs 250, 270, respectively, of waveforms of excitation and refocusing pulses, and resulting spin echo waveforms and NMR echo signal amplitudes, according to the disclosure. As described above, the NMR tool 102 is configured to provide an excitation pulse 252 followed by a series of refocusing pulses 254 to the surrounding formation. A spin echo waveform 256 follows each refocusing pulse 254, and the NMR tool 102 is configured to receive (e.g., acquire) the spin echo waveforms 256 from the surrounding formation. In FIGS. 2B and 2C, the spin echo waveforms 256 are shown in rotating frame, in which frequency dependencies are not depicted.

As described above, the NMR tool 102 (or the acquisition system thereof) is also configured to process each echo waveform 256 into an NMR echo signal amplitude, such as by integrating the echo waveform over an acquisition window duration (and, optionally, applying a weighting function to the acquisition window). In FIG. 2B, a first acquisition window duration is shown as 258 and a second acquisition window duration is shown as 260. A first NMR echo signal amplitude 262 is provided by integrating a corresponding spin echo waveform 256 over the first acquisition window 258, and a second NMR echo signal amplitude 264 is provided by integrating the corresponding spin echo waveform 256 over the second acquisition window 260. For example, integrating the spin echo waveforms 256a-256e over the first acquisition window 258 results in first NMR echo signal amplitudes 262a-262e, respectively. Similarly, integrating the spin echo waveforms 256a-256e over the second acquisition window 260 results in second NMR echo signal amplitudes 264a-264e, respectively. In some examples, a weighting function is applied when integrating the spin echo waveform 256 over an acquisition window.

A first echo train (or first relaxation data) includes the first NMR echo signal amplitudes 262a-262e, while a second echo train (or second relaxation data) includes the second NMR echo signal amplitudes 264a-264e. Accordingly, the first echo train or relaxation data is associated with (or determined using) the first acquisition window 258 duration, while the second echo train or relaxation data is associated with (or determined using) the second acquisition window 260 duration.

The graph 270 of FIG. 2C is an extended version of the graph 250 shown in FIG. 2B, such as including additional refocusing pulses 254, and thus corresponding additional spin echo waveforms 256.

As described further below, the effects of lateral motion on the NMR tool 102 (e.g., a motion component of the NMR echo signal amplitude) may be identifiable or determinable by determining the first and second NMR echo signal amplitudes using different acquisition window durations. Accordingly, the NMR tool 102 also includes a processor that is configured to perform data inversion using the first echo train (or relaxation data) 262 and the second echo train (or relaxation data) 264, which may be useful to determine a transversal relaxation spectra (e.g., T2) or other parameters related to spin relaxation times (e.g., T1-T2 two-dimensional relaxation spectrum) based on the NMR echo signal amplitudes determined using different acquisition window durations.

Figures 3A, 3B:
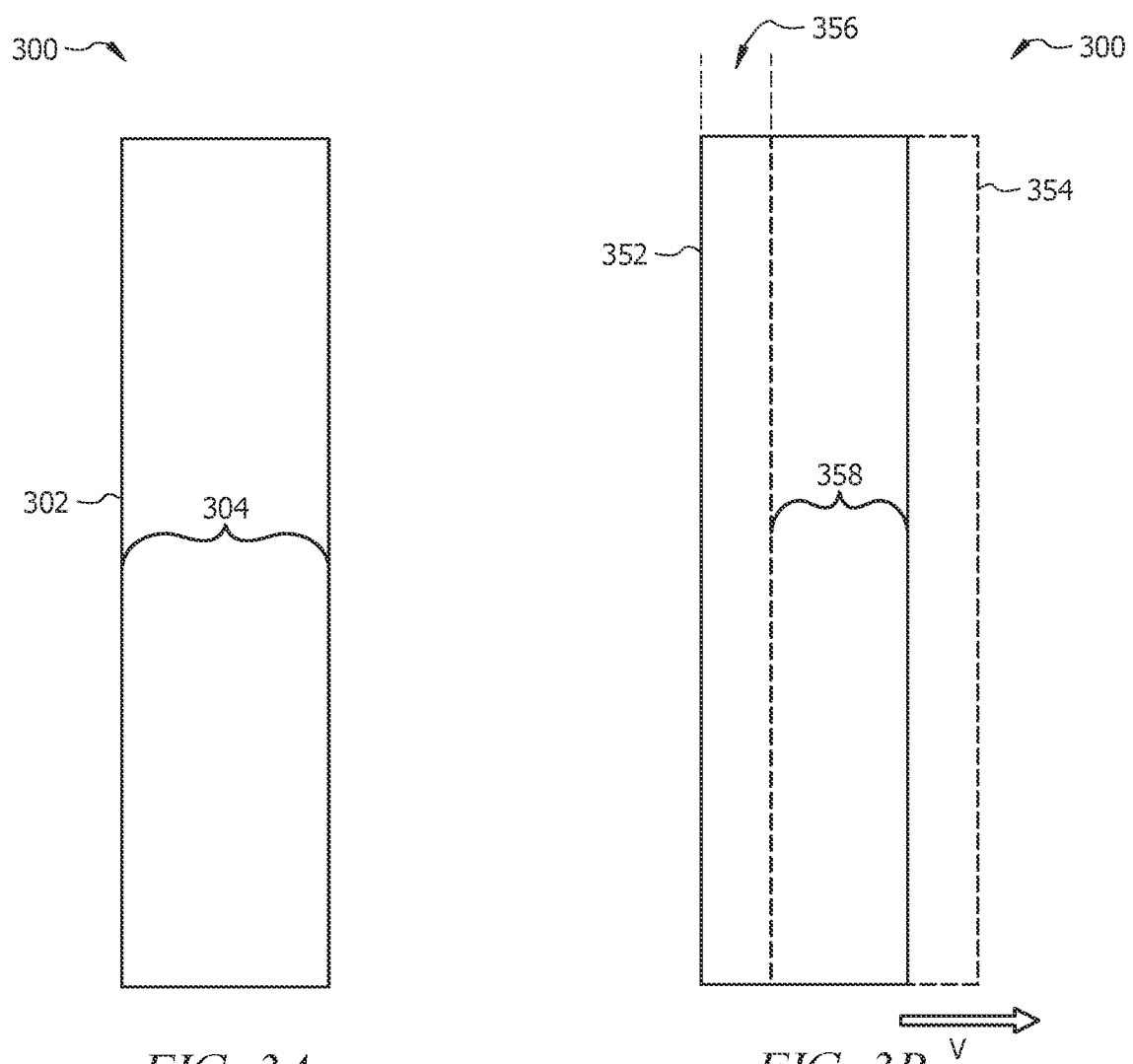
FIGS. 3A and 3B are schematic representations of examples of the lateral motion effect on NMR relaxation data.

FIGS. 3A and 3B are illustrative representations of causes of the lateral motion effect on NMR relaxation data addressed, at least in part, by embodiments of this description. FIG. 3A shows a cross-section of a frontal fragment 302 of a cylindric shell sensitivity volume 300. A thickness 304 of the sensitivity volume 300 is substantially defined by the NMR system bandwidth (e.g., based on the refocusing RF pulse width and the spin echo signal acquisition window) and the gradient (e.g., localization) of the static magnetic field.

FIG. 3B illustrates an example situation in which the NMR tool 102 moves laterally during the CPMG sequence. Accordingly, a potential sensitivity volume moves laterally with the NMR tool 102. An initial position of the NMR tool 102 at the beginning of the sequence is shown at 352, while a position of the NMR tool 102 at the end of the sequence is shown at 354. A total lateral displacement (e.g., a unidirectional lateral motion is assumed in this example) is shown at 356. The spin echoes may be considered as substantially unaffected by the motion only in the part of the sensitivity volume that is an overlap of the initial (352) and the final (354) positions of the sensitivity volume. A width of such overlap is shown at 358.

Figure 4:
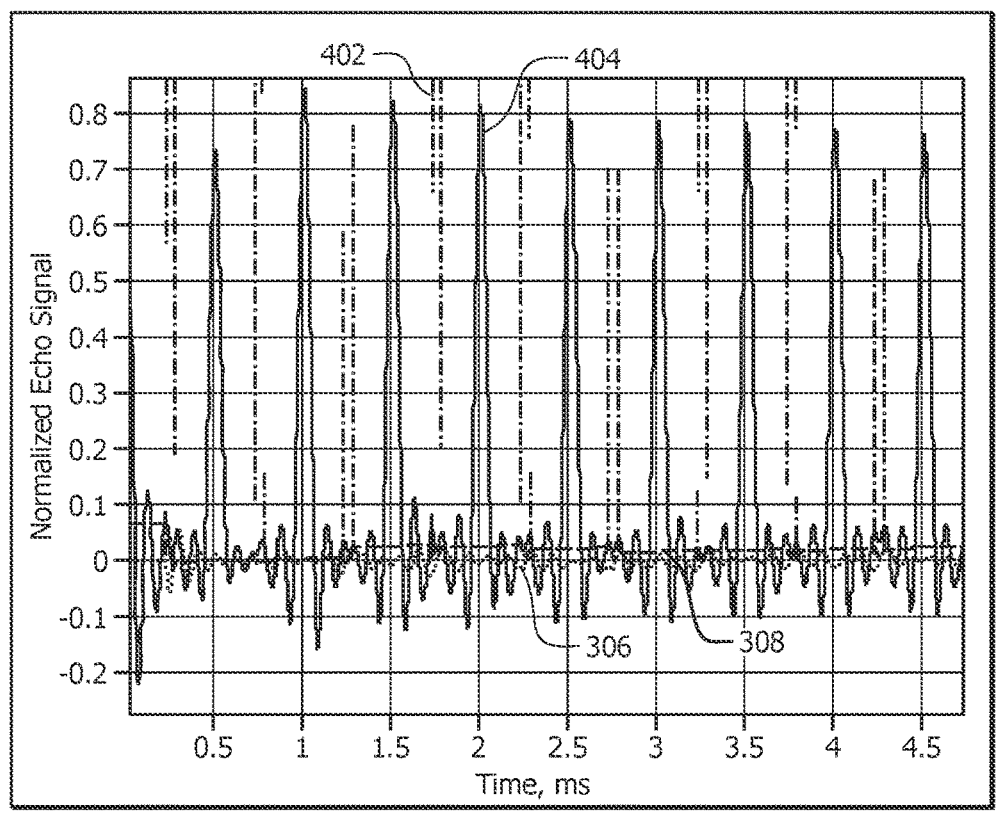
FIG. 4 is a graph of example waveforms of radio frequency (RF) refocusing pulses applied to a subterranean volume and resulting spin echo signals acquired from the volume.

FIG. 4 is a graph 400 of example waveforms of radio frequency (RF) pulses, which are demonstrated as envelopes of RF pulses notated 402, applied to a subterranean volume, such as the subterranean region 120. The graph 400 also includes resulting main, in-phase components of spin echo signals, notated 404, acquired from the volume. The spin echo signals 404 may be acquired from the volume by the NMR tool 102, such as by the antennas 210a, 210b. The graph 400 also includes an out-of-phase component of the spin echo signals, notated 406, and a longitudinal component of the spin echo signals, notated 408. The RF refocusing pulses represented by envelopes 402 and the resulting, acquired spin echo signals (e.g., the main, in-phase components 404) are shown as normalized (e.g., to a value of 1.0) magnitudes as a function of time. In the example of FIG. 4, the acquired spin echo signals 404 occur between the RF refocusing pulses 402.

Figure 5:
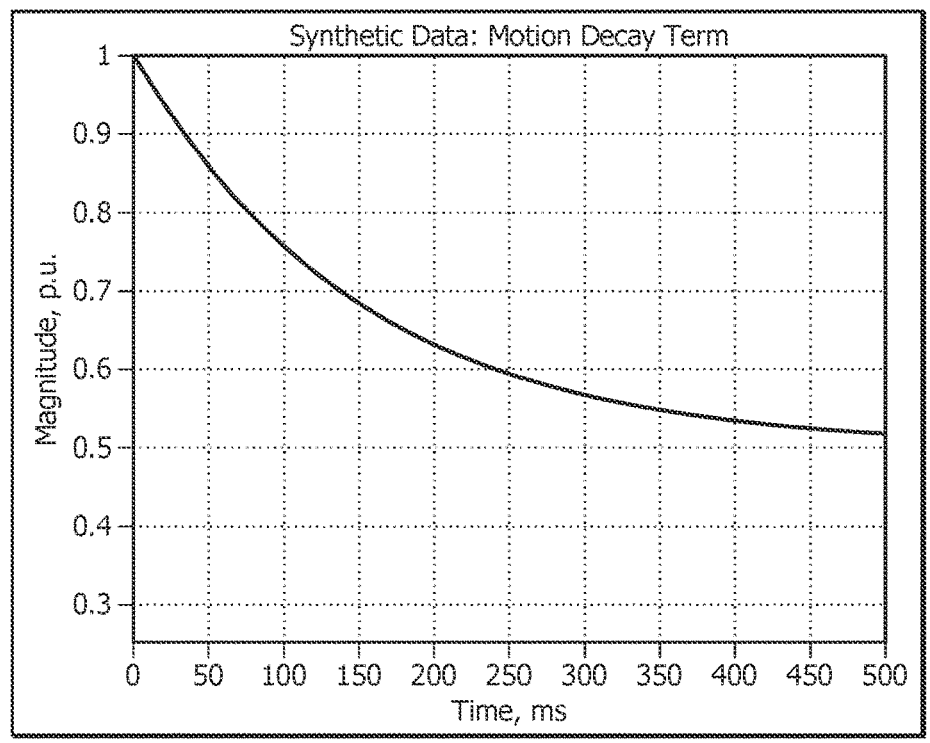
FIG. 5 is an example of the lateral motion effect in a form of additional spin echo attenuation.

FIG. 5 is a graph 500 of an example of the lateral motion effect in a form of additional spin echo attenuation $\mathcal{F}_{MD}$ (additional apparent relaxation) due to lateral motion of the NMR tool 102 with constant velocity. The graph 500 illustrates that lateral motion of the NMR tool 102 manifests as such additional apparent relaxation, which cannot necessarily be distinguished from intrinsic relaxation due to natural/environmental conditions being sensed. The model of additional spin echo attenuation due to lateral motion shown in FIG. 5 is represented by Equation 1:

$$\mathcal{F}_{MD}(T_{2M}, m0, t_i) = m0 \cdot e^{\frac{-t_i}{T_{2M}}} + (1 - m0) \quad (1)$$

Where m0 and $T_{2M}$ are parameters of the model (e.g., a constant value m0=0.5 and a time constant value $T_{2M}$=150 ms for the lateral motion echo attenuation term shown in FIG. 5) and $t_i$ are the echo times.

Figure 6A:
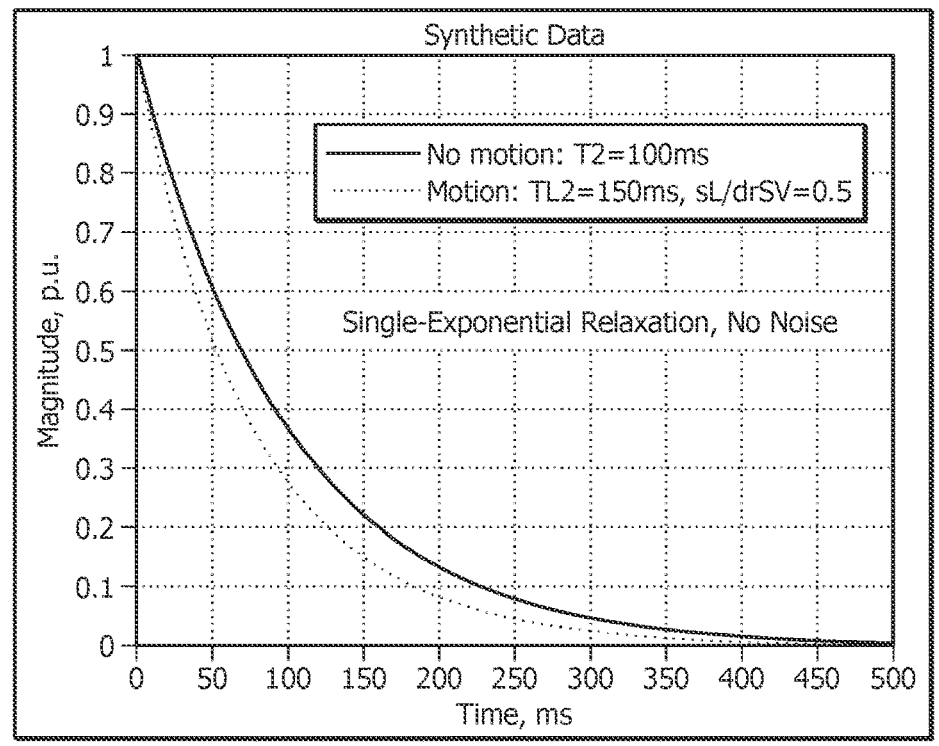
FIGS. 6A and 6B are examples of synthetic relaxation data, without and with an added noise component, respectively.
Figure 6B:
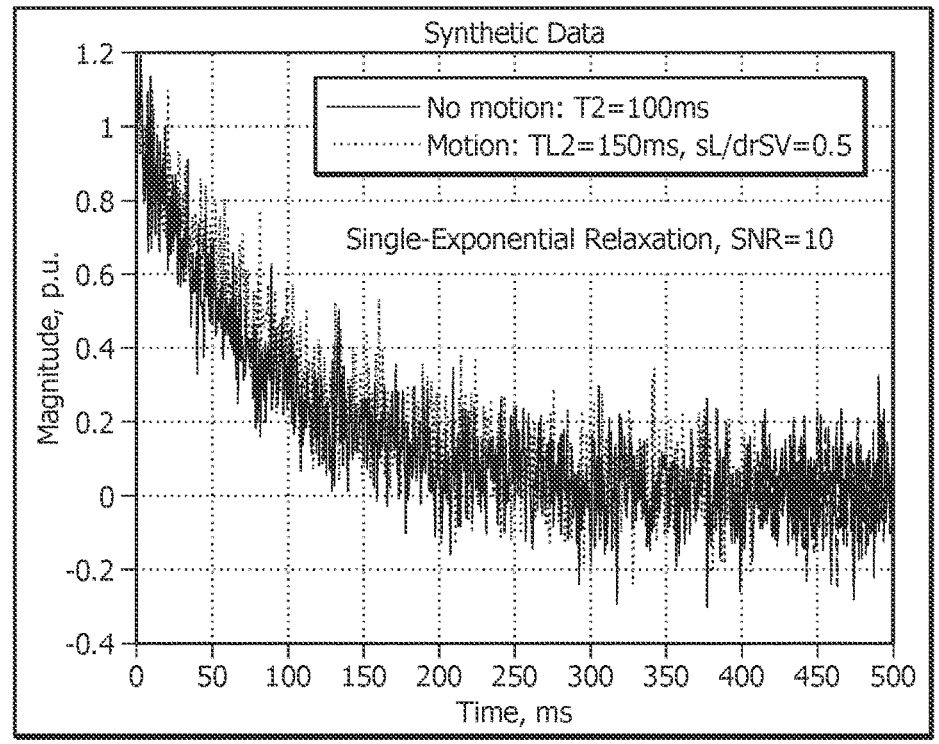

FIG. 6A is a graph 600 of an example of synthetic relaxation data, without an added noise component. FIG. 6B is a graph 650 of an example of the synthetic relaxation data of FIG. 6A, but with an added noise component. In each graph 600, 650, one plot ("no motion") reflects synthetic relaxation data without a motional term (e.g., as represented in Equation 1, above), while the other plot ("motion") reflects synthetic relaxation data including the motional term from Equation 1, above. The synthetic data set used to generate the graph 650 is a single exponential term (which can be multiplied by the motional term and/or added to a noise term) represented by Equation 2:

$$f_{SYNTH} = A \cdot e^{-\frac{t_i}{T_2}} \cdot \mathcal{F}_{MD}(T_{2M}, m0, t_i) + \text{noise} \quad (2)$$

The graph 600 is also generated according to Equation 2, but without the added noise component.

In an example, the synthetic data from Equation 2, including the motional term and the noise term, may be inverted, such as by fitting using a least-squares fitting, to determine values for A, T2, and $T_{2M}$. Equation 3 is an example of the least-squares fitting solution:

$$\|\mathcal{F}(A_p, T_2, p_{MDq}, t_i) - f_{SYNTH}(t_i)\| \rightarrow \min \quad (3)$$

Where $\mathcal{F}$ is a fitting function and $p_{MDq}$ represents parameters related to lateral motion (e.g., T2M and m0).

Figure 7:
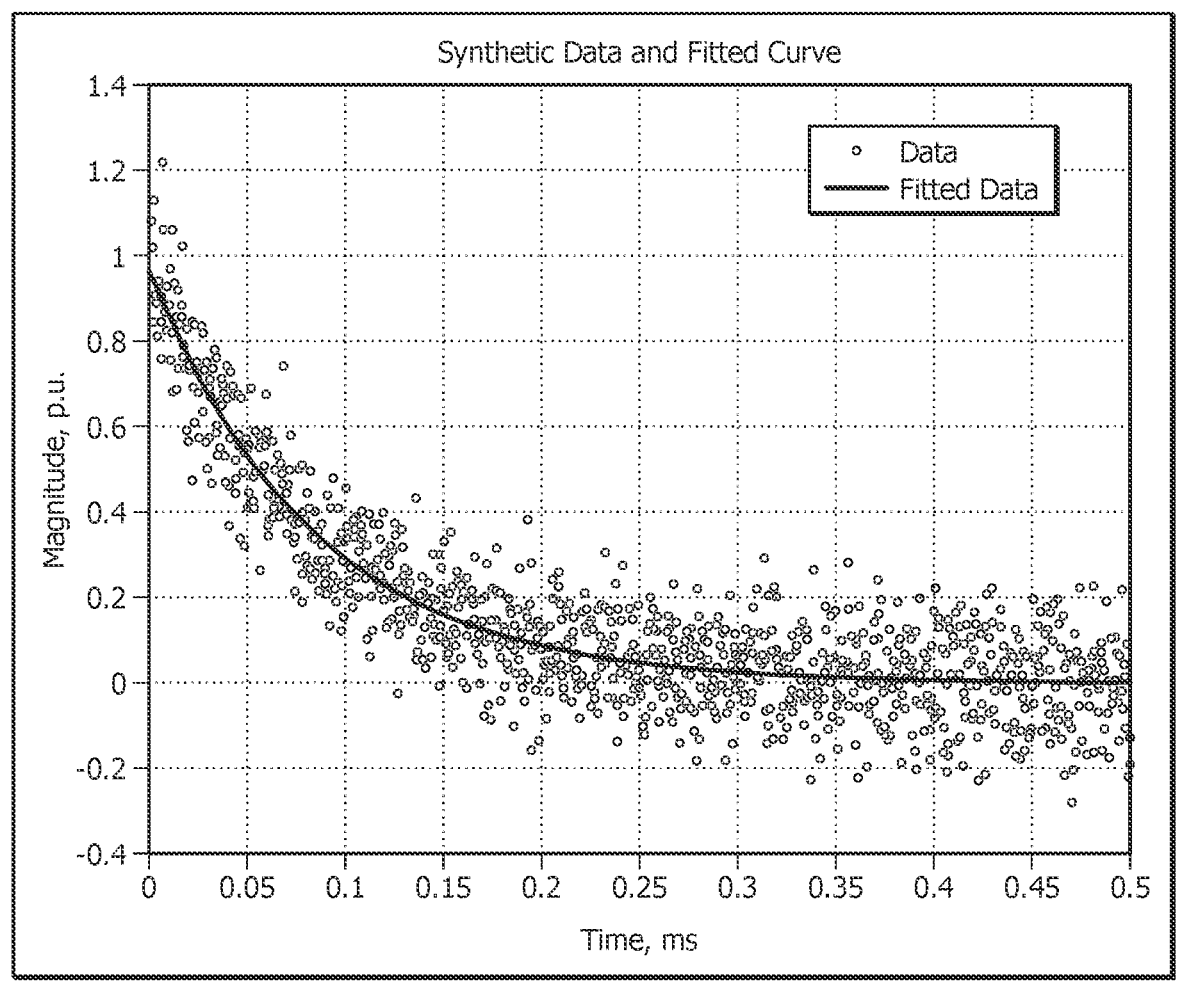
FIG. 7 is an example of fitting a curve to synthetic relaxation data, such as from FIG. 6B.

FIG. 7 is a graph 700 of an example of the results of the fitting from Equation 3, and includes both the synthetic data (e.g., from Equation 2, including the motional term and the noise term) as well as the fitting function determined in Equation 3.

Table 1 presents values for the parameters that were used to generate the synthetic data set of Equation 2, in which A is an amplitude parameter from Equation 2, T2 is the relaxation parameter from Equation 2, T2M is the apparent additional relaxation parameter (i.e., due to lateral motion) from Equation 1, and m0 is an amplitude parameter from Equation 1. Table 1 compares the parameter values used to generate the synthetic data set with those obtained by performing inversion on the synthetic data (including noise as in graph 650).

TABLE 1

Comparison of Parameter Values for Synthetic Data and Results of Inversion

| Parameter | A, a.u. | $T_2$, ms | $T_{2M}$, ms | $m_0$, a.u. |
|---|---|---|---|---|
| Synthetic | 1.000 | 100 | 150 | 0.500 |
| Inverted | 0.966 | 84.5 | 5920 | 0.932 |

As demonstrated, particularly for T2, T2M, and m0, significant error is present between the parameter values used to generate the synthetic data set and the parameter values obtained through inversion (e.g., by a least-squares fitting). As described above, this error is a manifestation of non-uniqueness and equivalence of inversion solutions. For example, referring to Equations 1 and 2, for m0=0, Equation 2 simplifies to a single exponential term with one effective relaxation time constant. Accordingly, the intrinsic relaxation T2 and the relaxation due to lateral motion (T2M) are indistinguishable, which results in many (e.g., infinite) solutions that could result in the same apparent T2.

Figure 8A:
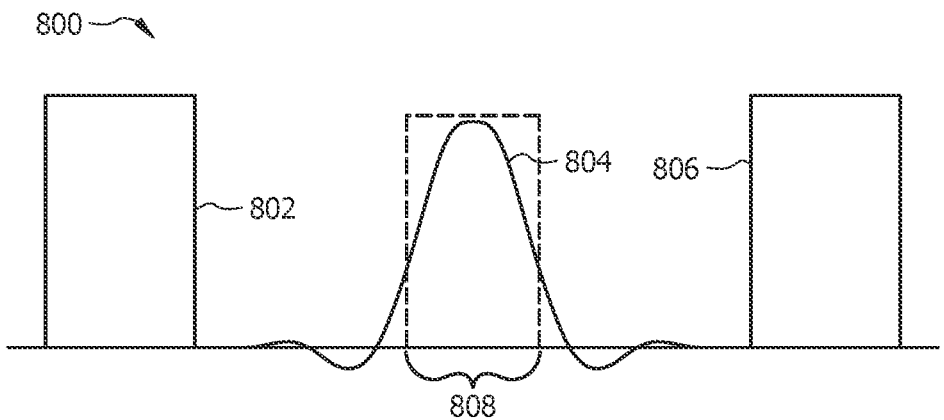
FIGS. 8A-8C are schematic examples of different acquisition window durations for a single spin echo between RF refocusing pulses.
Figure 8B:
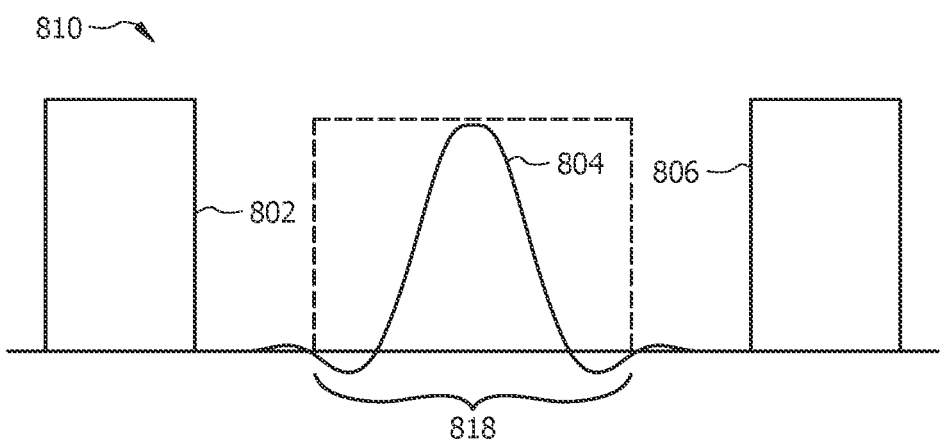
Figure 8C:
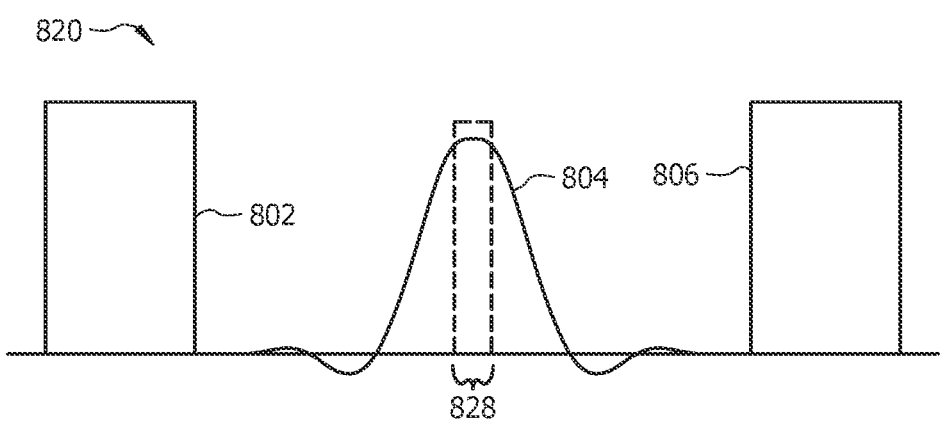

FIGS. 8A-8C show examples of different acquisition windows for a single spin echo between RF refocusing pulses. Each of FIGS. 8A-8C includes a first RF refocusing pulse 802, a resulting spin echo 804, and a second or subsequent RF refocusing pulse 806. FIG. 8A shows a first example 800 in which a first acquisition window 808 is used. FIG. 8B shows a second example 810 in which a second acquisition window 818 is used. FIG. 8C shows a third example 820 in which a third acquisition window 828 is used. The acquisition windows 808, 818, 828 correspond to time domain filters over which the spin echo signal 804 is integrated. The result of such integration is an NMR echo signal amplitude, which amplitude is influenced by relaxation components and a motional components in some examples.

In the first example 800, the first acquisition window 808 has a duration that is selected to improve or maximize SNR of the spin echo 804. In the second example 810, the second acquisition window 818 has a duration that is greater than the duration of the first acquisition window 808, and thus corresponds to a narrower-band reception in the frequency domain. In the third example 820, the third acquisition window 828 has a duration that is less than the duration of the first acquisition window 808, and thus corresponds to a wider-band reception in the frequency domain. In some cases, the second and third acquisition windows 818, 828 result in inferior SNR of the spin echo 804 relative to the first acquisition window 808. However, the third, shorter acquisition window 828 in particular may be useful to reduce the time between RF refocusing pulses 802, 806, and correspondingly the time-to-echo (TE). In some cases, a smaller TE may be useful when the NMR signal includes relatively short relaxation components to be acquired. The acquisition window is shown centralized on the echo here, but is not limited to being timed to be centered on the echo waveform.

As explained above, NMR signals (e.g., processed spin echoes) acquired or generated using different acquisition window durations, which correspond to different reception bandwidths, have different sensitivities to motion effects, or lateral displacement, of the NMR tool 102.

Referring generally to FIGS. 8A-8C, the acquisition window represents weights for samples of the spin echo waveform or signal, and those weights are used when integrating the spin echo waveform to obtain an NMR echo signal amplitude. In an example in which two acquisition windows are used, one of the acquisition windows (e.g., a first of the acquisition windows) may be selected corresponding to matched reception, such as to maximize an integrated echo signal-to-noise ratio (SNR). The other of the acquisition windows (e.g., a second of the acquisition windows) may be used to increase sensitivity to lateral motion of the NMR tool 102.

In one example, the first window has a rectangular shape (e.g., applies a uniform weighting function) with a length (e.g., duration) that is substantially equal to the length of the refocusing RF pulse. In this example, the second window also has a rectangular shape and is selected to be longer than the first window. Specifically, the second window can be asymmetrical relative to the echo signal to start substantially at the same time as the first (shorter) window and to end before the start of a subsequent refocusing RF pulse. In this example, such a shift enables avoidance of penetrating an undesired ringing signals that may be present after a refocusing pulse.

In another example, the second window may be selected to respond to motion while having smaller or substantially zero integrated spin echo signal with no lateral motion. The frequency domain representation of the acquisition window in this case may have the main part of the spectrum located beyond the spin echo waveform spectrum with no lateral motion (in time domain this corresponds to an oscillating acquisition window).

In other examples, the first and/or second windows may have shapes other than rectangular, such as a "bell curve", or other distribution functions. These other distribution shapes apply non-uniform weighting functions to the spin echo waveform being integrated over the duration of the acquisition window. These are shown in FIG. 2A as examples of the acquisition window weighting functions that may be applied to acquisition windows 258, 260.

Figure 9A:
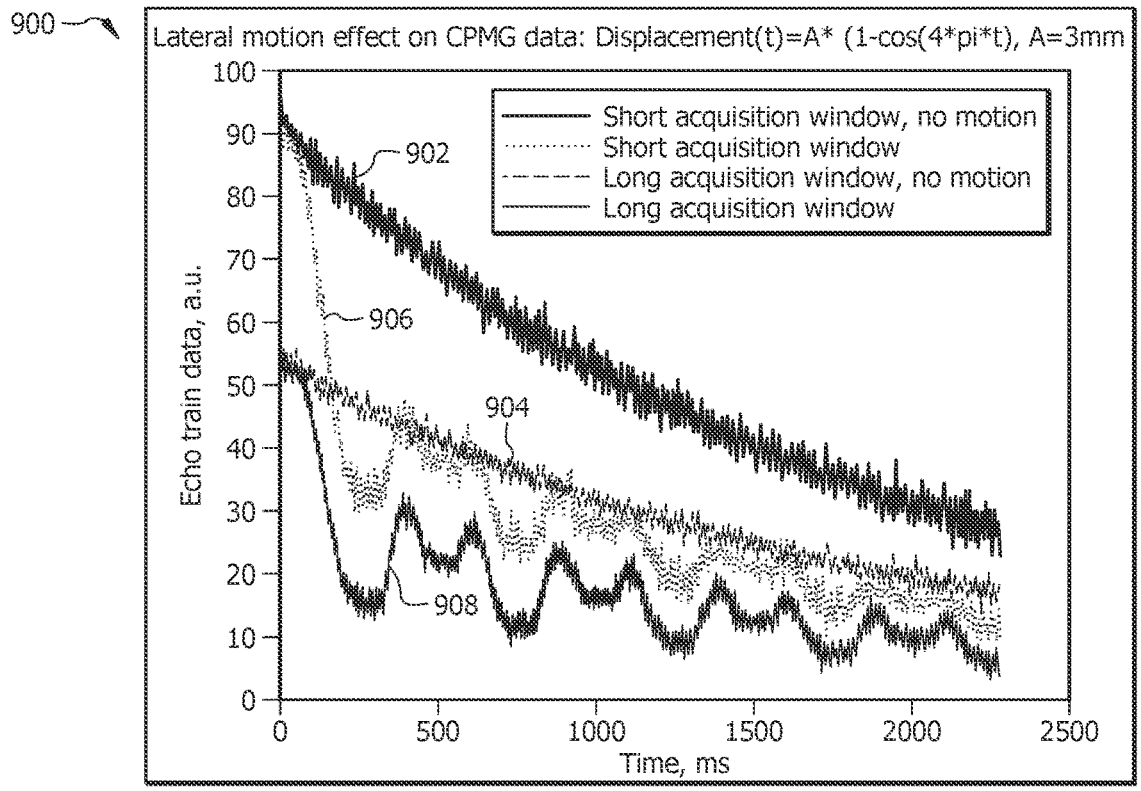
FIG. 9A is a graph of example relaxation curves of experimental NMR relaxation data for different acquisition window durations, and for which the NMR tool was and was not subjected to lateral motion.

FIG. 9A is a graph 900 of echo trains of experimental NMR signals or relaxation data (e.g., generated from spin echo magnitudes in arbitrary (machine) units as a function of time) for different acquisition window durations, and for which the NMR tool 102 was and was not subjected to lateral motion. The experimental echo trains in the graph 900 were obtained using a water sample (e.g., a single-exponential relaxation), with a sensitivity volume thickness of 6 millimeters. In the example of FIG. 9A, two different acquisition windows (e.g., a relatively shorter acquisition window, and a relatively longer acquisition window) were used to derive the NMR echo signal amplitudes from acquired echo waveforms. The graph 900 includes a first echo train (e.g., relaxation curve) 902, which corresponds to a first (e.g., relatively shorter) acquisition window duration, and a second echo train (e.g., relaxation curve) 904, which corresponds to a second (e.g., relatively longer) acquisition window duration. The NMR tool 102 was not subjected to lateral motion while the NMR echo signal amplitudes used to generate the first and second echo trains 902, 904 were obtained.

The graph 900 also includes a third echo train (e.g., relaxation curve) 906, which corresponds to the first acquisition window duration, and a fourth echo train (e.g., relaxation curve) 908, which corresponds to the second acquisition window duration. The NMR tool 102 was subjected to lateral motion while the echo trains 906, 908 were obtained. In this example, the NMR tool 102 was subjected to a lateral displacement given by:

$$\text{Displacement}(t) = \text{amp} \cdot [1 - \cos(4\pi \cdot t)] \tag{4}$$

In which amp represents an amplitude of 3 millimeters, and t represents time as the independent variable. Accordingly, the third and fourth echo trains 906, 908 include both a relaxation component and a motion component.

As explained above, the acquisition windows correspond to time domain filters over which the acquired spin echo waveform signal is integrated to generate the corresponding NMR echo signal amplitude. Accordingly, in the example of FIG. 9A, the echo trains (or NMR relaxation curves) 902, 904 each includes NMR echo amplitudes that were obtained using acquisition windows having a same duration (although the acquisition window duration for the first echo train 902 is different than the acquisition window duration for the second echo train 904), and while the NMR tool 102 was not subjected to lateral motion. Similarly, the echo trains 906, 908 were obtained using acquisition windows having different durations, and while the NMR tool 102 was subjected to lateral motion (e.g., as given by Equation 4, above).

Figure 9B:
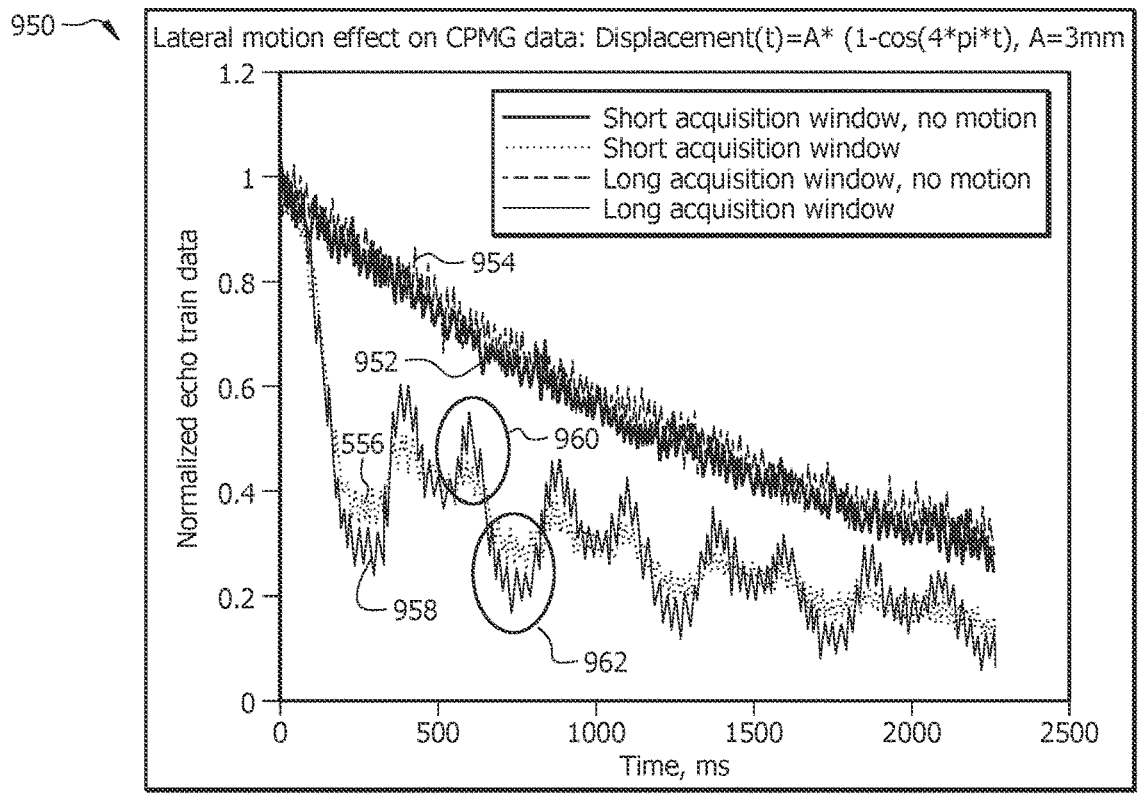
FIG. 9B is a graph of the waveforms of FIG. 9A normalized to adjust for different acquisition window durations.

FIG. 9B is a graph 950 of the echo trains of FIG. 9A normalized (e.g., mapped to a value between 0 and 1.0) to adjust for the fact that the NMR signals were generated using different acquisition window durations. The graph 950 includes NMR signal 952, which is a normalized version of NMR signal 902 in the graph 900; NMR signal 954, which is a normalized version of NMR signal 904 in the graph 900; NMR signal 956, which is a normalized version of NMR signal 956 in the graph 900; and NMR signal 958, which is a normalized version of NMR signal 958 in the graph 900.

As demonstrated by FIG. 9B, motion effects (e.g., lateral displacement over time) on the NMR tool 102 are observable by comparing echo trains acquired during acquisition windows having different durations. For example, in the situation where the NMR tool 102 does not experience lateral motion, which corresponds to normalized NMR signals 952, 954, those normalized NMR echo trains 952, 954 are substantially coincident. However, in the situation where the NMR tool 102 experiences lateral motion, which corresponds to normalized NMR echo trains 956, 958, those normalized NMR echo trains 956, 958 differ. For example, the NMR echo trains 956, 958 are visibly different in both peak regions 960 as well as valley regions 962. Accordingly, the motion of the NMR tool 102 results in motion-affected echo(es) in the NMR echo trains that differ when generated based on NMR echo signal amplitudes determined using acquisition windows having different durations. The resulting echo train can be considered as containing different components. For example, various components are multiplied (e.g., as coefficients) or additive (e.g., as offsets) contributions to the received signal. A component may be the intrinsic relaxation of the sample. Other components are ones which have caused a perturbation to the signal from being the intrinsic one such as tool motion, diffusion, and magnetic field gradients. Some perturbation may have interdependencies on each other such as diffusion and field gradient. Thereby one component might be the motion component which tends to decrease the signal level. The examples described herein identify or determine such motion components by analyzing and/or processing the NMR echo trains acquired using acquisition windows having different durations (e.g., a first echo train generated by applying a first acquisition window to spin echo waveforms, and a second echo train generated by applying a second acquisition window to spin echo waveforms).

Figure 10:
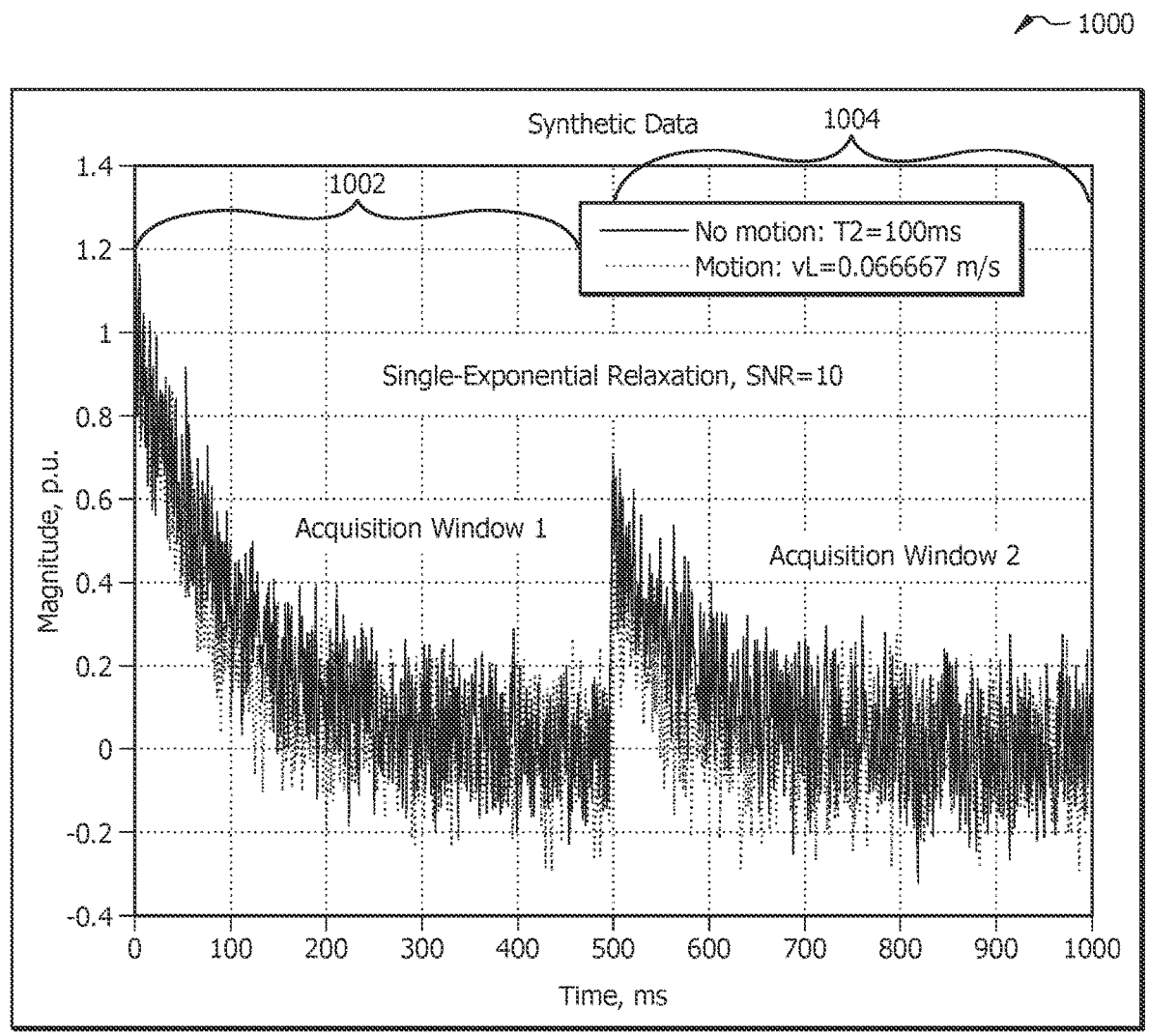
FIG. 10 is an example of synthetic relaxation data acquired over two acquisition windows with an added noise component.

FIG. 10 is a graph 1000 of an example of synthetic relaxation data (with an added noise component, such as in Equation 2 above) that includes a first portion 1002 that is determined using a first acquisition window (Acquisition Window 1), and a second portion 1004 that is determined using a second acquisition window (Acquisition Window 2), as described above with respect to FIGS. 8A-8C. Similar to FIG. 6B, in the graph 1000, one plot ("no motion") reflects synthetic relaxation data without a motional term, while the other plot ("motion") reflects synthetic relaxation data including the motional term in a form similar to Equation 1, above. However, unlike FIG. 6, which shows relaxation data determined using a single acquisition window, the graph 1000 reflects relaxation data determined using two different acquisition windows. For simplicity of illustration, the graph 1000 shows this relaxation data as being sequential with respect to time. That is, the first portion 1002 corresponds to a first echo train determined by applying the first acquisition window to a plurality of spin echo waveforms, while the second portion 1004 corresponds to a second echo train determined by applying the second acquisition window to the plurality of spin echo waveforms. The synthetic data set used to generate the graph 1000 can be expressed as in Equations 5:

$$f_{SYNTH} = \begin{vmatrix} \frac{A}{w_1} \cdot e^{-\frac{t_i}{T_2}} \cdot \mathcal{F}_{MD}(T_{2M}, m0, t_{i1}, w_1) + \text{noise} \\ \frac{A}{w_2} \cdot e^{-\frac{t_i}{T_2}} \cdot \mathcal{F}_{MD}(T_{2M}, m0, t_{i2}, w_2) + \text{noise} \end{vmatrix} \quad (5)$$

Where w1 and w2 are acquisition window multipliers as additional parameters. For example, the first of the Equations 5 corresponds to the first portion 1002, while the second of the Equations 5 corresponds to the second portion 1004.

Similar to above, the synthetic data from Equation 5, including the motional term and the noise term, may be inverted, such as by fitting, using a least-squares fitting, an expression to the synthetic data, to determine values for A, T2, and the motion parameters $p_{MDq}$ (e.g., T2M and m0). Equation 6 is an example of the least-squares fitting solution:

$$\|\mathcal{F}(A, T_2, p_{MDq}, t_{ij}, w_j) - f_{SYNTH}(t_{ij}, w_j)\| \to \min \quad (6)$$

Where $\mathcal{F}$ is a fitting function or an expression (e.g., a basis function) and $p_{MDq}$ represents parameters related to lateral motion. Accordingly, a single inversion is performed using the first echo train (e.g., of the first portion 1002) and the second echo train (e.g., of the second portion 1004), which determines at least a transversal relaxation spectra or a relaxation parameter (e.g., T2 parameter). Further, the single inversion includes fitting the fitting function or expression to the first and second echo trains, and the expression includes the relaxation parameter as well as a motion parameter, which is separate from the relaxation parameter. In some examples, as described above, additional echo trains (e.g., third and beyond) may be determined using additional acquisition window durations, and the single inversion is thus performed using those additional echo trains as well.

Figure 11:
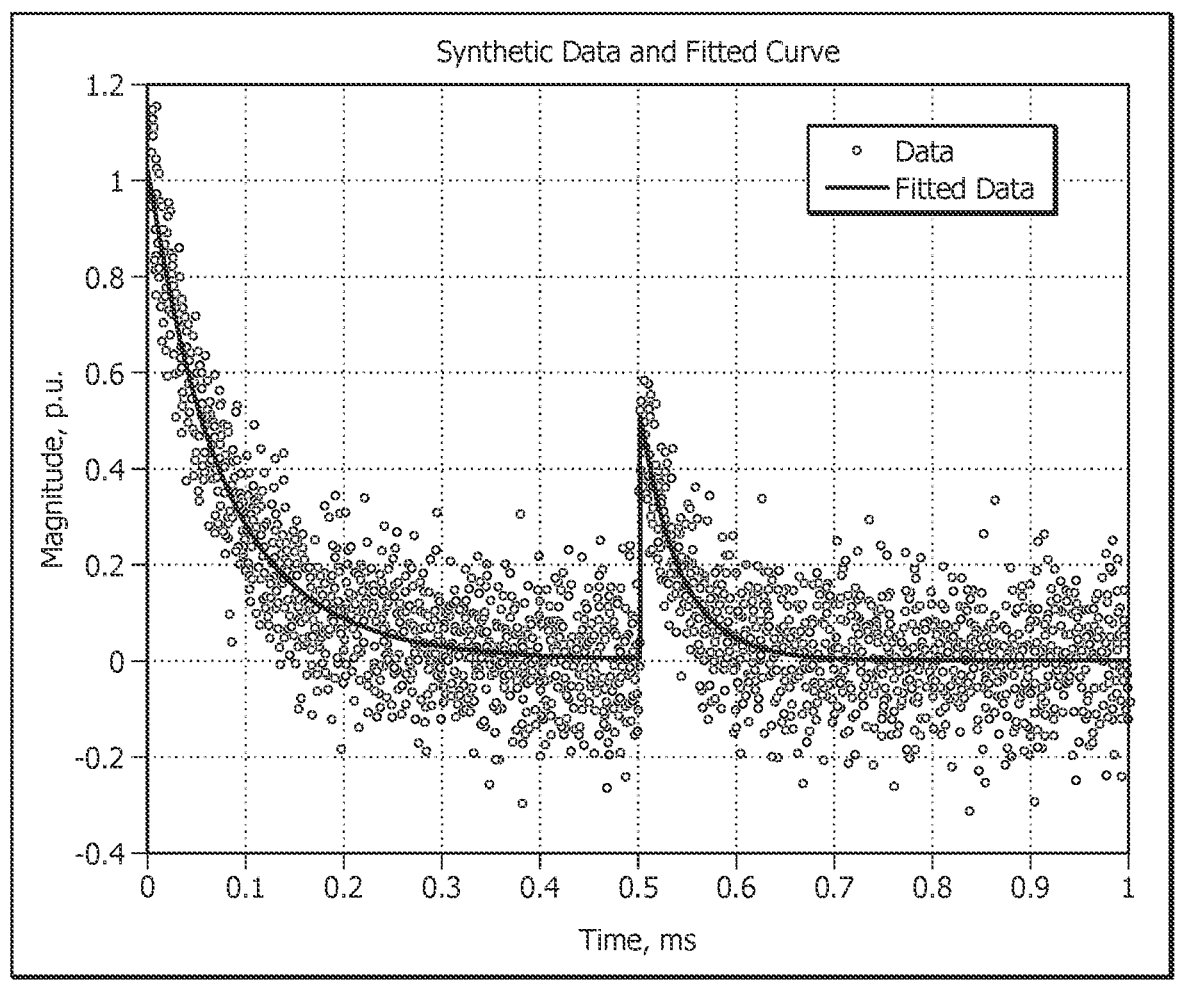
FIG. 11 is an example of fitting a curve to the synthetic relaxation data from FIG. 10.

FIG. 11 is a graph 1100 of an example of the results of the inversion, or fitting using Equation 6, and includes both the synthetic data (e.g., from Equation 5, including the motional term and the noise term) as well as the fitting function determined in Equation 6.

Table 2 presents values for the parameters that were used to generate the synthetic data set of Equation 5, in which A is an amplitude parameter from Equation 5, T2 is the relaxation parameter from Equation 5, T2M is the apparent relaxation parameter (i.e., due to lateral motion) from Equation 1, and m0 is an amplitude parameter from Equation 1. Table 2 compares the parameter values used to generate the synthetic data set with those obtained by performing inversion.

TABLE 2

Comparison of Parameter Values for Synthetic Data and Results of Inversion Using Two Acquisition Windows

| Parameter | A, a.u. | T2, ms | T2M, ms | m0, a.u. |
|---|---|---|---|---|
| Synthetic | 1.000 | 100 | 150 | 0.500 |
| Inverted | 0.988 | 100 | 146 | 0.494 |

As demonstrated, unlike Table 1, Table 2 shows relatively good agreement between the synthetic parameter values and those obtained through inversion. Accordingly, Table 2 demonstrates at least one advantage of generating first and second echo trains using different acquisition window durations (e.g., a first echo train generated by applying a first acquisition window to spin echo waveforms, and a second echo train generated by applying a second acquisition window to spin echo waveforms), and performing subsequent data inversion using the first echo train and the second echo train, such as to determine a transversal relaxation spectra (e.g., T2) or/and other parameters related to spin relaxation times based on the first and second echo trains.

In the model of the motion effect used above (e.g., the model of Equation 1), the parameters of motion represented by T2M and m0 can be expressed as parameters of lateral displacement, including lateral velocity. The above examples represent lateral motion with a constant velocity and with a maximum displacement. However, to be useful in a general lateral motion effect model (e.g., where lateral motion may be arbitrary), the lateral motion behavior may be parameterized. In one example, the NMR tool 102 includes an accelerometer configured to provide data indicative of acceleration(s) of the NMR tool 102 ("accelerometer data" for simplicity). Because initial velocity of the NMR tool 102 may not be known, the accelerometer data cannot simply be integrated to provide a velocity of the NMR tool 102 over time. Regardless, the accelerometer data may still be useful to choose a proper basis function for inversion, and parameters of lateral motion, in order to improve the motion effect model and thus subsequent data inversion using the first and second echo trains.

In one example, the NMR tool 102 also includes an accelerometer (or multiple accelerometers) that are configured to generate data indicative of acceleration of the NMR tool 102 in one or more directions. In some examples, a lateral velocity of the NMR tool 102 is calculated or determined (e.g., at the beginning or end of the CPMG train), and the accelerometer is useful to determine or calculate a time-dependent displacement during the CPMG train by integrating the accelerometer data. The initial velocity is an initial condition needed for the integration of acceleration data (a initial condition for the displacement may be 0 since the displacement of interest starts with the beginning of the train).

Figure 12:
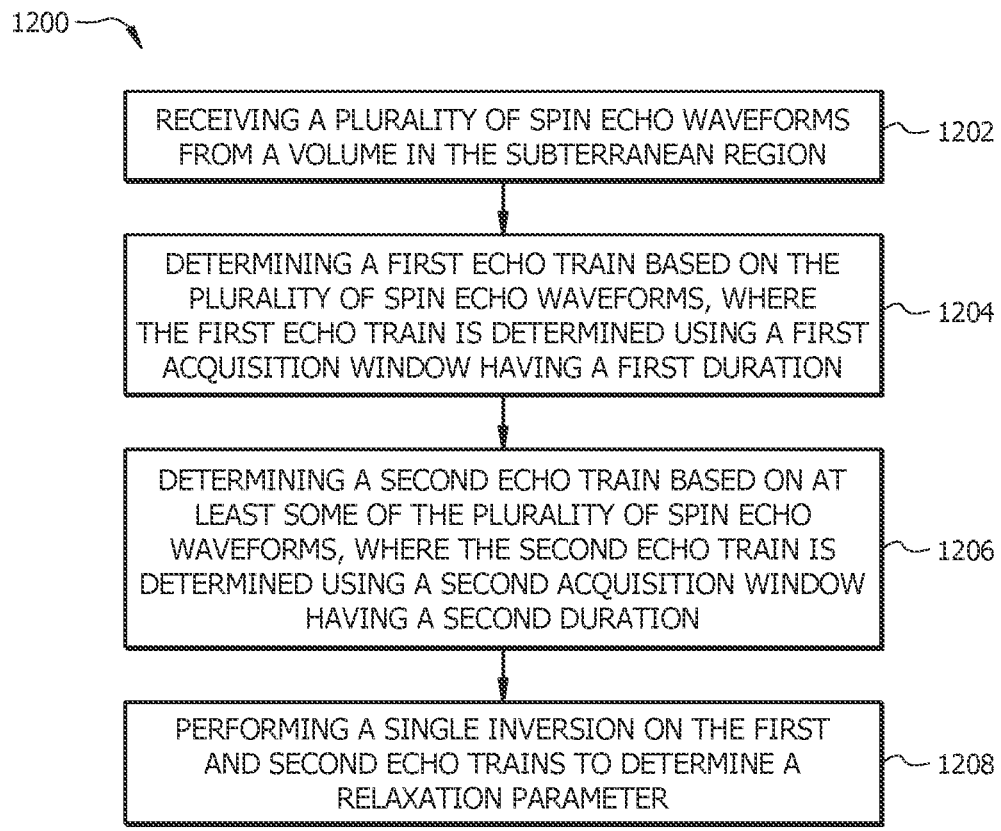
FIG. 12 is a flow chart of a method according to the disclosure.

FIG. 12 is a flow chart of a method 1200 in accordance with examples described herein. In some examples, at least some of the operations of the method 1200, as well as other operations described herein, can be implemented as instructions stored in a computer-readable medium and executed by one or more processors 113 (along with acquisition system 111) of the computing subsystem 110. The method 1200 begins in block 1202 with receiving a plurality of spin echo waveforms from a volume in the subterranean region.

The method 1200 continues in block 1204 with determining a first echo train based on the plurality of spin echo waveforms. The first echo train is determined using a first acquisition window having a first duration. For example, the first echo train includes a first plurality of NMR echo signal amplitudes, where each NMR echo signal amplitude of the first plurality is determined by integrating a corresponding spin echo waveform over the first acquisition window.

The method 1200 continues in block 1206 with determining a second echo train based on at least some of the plurality of spin echo waveforms. The second echo train is determined using a second acquisition window having a second duration, and the second duration is different than the first duration. For example, the second echo train includes a second plurality of NMR echo signal amplitudes, where each NMR echo signal amplitude of the second plurality is determined by integrating a corresponding spin echo waveform over the second acquisition window.

As described above with respect to FIG. 2B, integrating the spin echo waveforms 256a-256e over the first acquisition window 258 results in first NMR echo signal amplitudes 262a-262e, respectively. Similarly, integrating the spin echo waveforms 256a-256e over the second acquisition window 260 results in second NMR echo signal amplitudes 264a-264e, respectively. In some examples, a weighting function is applied when integrating the spin echo waveform 256 over an acquisition window to generate a corresponding NMR echo signal amplitude (e.g., a component of the broader echo train).

The method 1200 continues further in block 1208 with performing a single inversion on the first and second echo trains to determine a transversal relaxation spectra. For example, as described above with respect to FIG. 10, a single inversion is performed using the first echo train (e.g., of the first portion 1002) and the second echo train (e.g., of the second portion 1004), which determines at least a transversal relaxation spectra or a relaxation parameter (e.g., T2 parameter) by fitting an expression to the first and second echo trains. The expression that is fit to the first and second echo trains includes a relaxation parameter, such as the T2 parameter in the examples described above, as well as a motion parameter that is separate from the relaxation parameter.

Additional Disclosure

The following are non-limiting, specific embodiments in accordance with the present disclosure:

A first embodiment, which is a nuclear magnetic resonance (NMR) tool for use in a wellbore in a subterranean region, the NMR tool comprising: a magnet assembly configured to produce a magnetic field in a volume in the subterranean region; an antenna assembly configured to produce an excitation in the volume, and to receive a plurality of spin echo waveforms from the volume; and a computing system coupled to the antenna assembly and configured to: apply a first acquisition window having a first duration to each of the plurality of spin echo waveforms to generate a corresponding first plurality of NMR echo signal amplitudes, wherein a first echo train comprises the first plurality of NMR echo signal amplitudes; apply a second acquisition window having a second duration, wherein the second duration is different than the first duration, to at least some of the plurality of spin echo waveforms to generate a corresponding second plurality of NMR echo signal amplitudes, wherein a second echo train comprises the second plurality of NMR echo signal amplitudes; and determine a relaxation parameter based on a single inversion of the first and second echo trains.

A second embodiment, which is the NMR tool of the first embodiment, wherein the single inversion comprises fitting an expression to the first and second echo trains, wherein the expression comprises the relaxation parameter and a motion parameter.

A third embodiment, which is the NMR tool of the first embodiment, further comprising an accelerometer configured to generate acceleration data of the NMR tool, wherein the computing system is further configured to receive acceleration data from the accelerometer, and to use the acceleration data to determine a lateral displacement of the NMR tool as a function of time.

A fourth embodiment, which is the NMR tool of the first embodiment, wherein the first acquisition window and the second acquisition window are substantially symmetric with respect to a center of the spin echo waveforms.

A fifth embodiment, which is the NMR tool of the first embodiment, wherein the first acquisition window begins at a first time relative to a particular spin echo waveform, and wherein the second acquisition window begins approximately at the first time.

A sixth embodiment, which is the NMR tool of the fifth embodiment, wherein the particular spin echo waveform is acquired responsive to a first radio frequency (RF) pulse provided to the volume, and wherein at least one of the first acquisition window and the second acquisition window extends substantially to, but ends prior to, a closest subsequent RF pulse.

A seventh embodiment, which is the NMR tool of the first embodiment, wherein the duration of one of the first acquisition window and the second acquisition window is selected to optimize a signal-to-noise ratio of the first NMR echo signal amplitudes or the second NMR echo signal amplitudes, respectively.

An eighth embodiment, which is a method for using a nuclear magnetic resonance (NMR) tool in a wellbore in a subterranean region, the method comprising: determining a first echo train based on a plurality of spin echo waveforms acquired from a volume in the subterranean region, wherein the first echo train is determined using a first acquisition window having a first duration; determining a second echo train based on at least some of the plurality of spin echo waveforms, wherein the second echo train is determined using a second acquisition window having a second duration, wherein the second duration is different than the first duration; and performing a single inversion on the first and second echo trains to determine a relaxation parameter.

A ninth embodiment, which is the method of the eighth embodiment, wherein the single inversion comprises fitting an expression to the first and second echo trains, wherein the expression comprises the relaxation parameter and a motion parameter.

A tenth embodiment, which is the method of the eighth embodiment, further comprising: receiving, from an accelerometer, acceleration data of the NMR tool; and determining a lateral displacement of the NMR tool as a function of time based on the acceleration data.

An eleventh embodiment, which is the method of the eighth embodiment, wherein the first acquisition window and the second acquisition window are substantially symmetric with respect to a center of the spin echo waveforms.

A twelfth embodiment, which is the method of the eighth embodiment, wherein the first acquisition window begins at a first time relative to a particular spin echo waveform, and wherein the second acquisition window begins approximately at the first time.

A thirteenth embodiment, which is the method of the twelfth embodiment, wherein the particular spin echo waveform is acquired responsive to a first radio frequency (RF) pulse provided to the volume, and wherein at least one of the first acquisition window and the second acquisition window extends substantially to, but ends prior to, a closest subsequent RF pulse.

A fourteenth embodiment, which is the method of the eighth embodiment, wherein the first echo train comprises a plurality of first NMR echo signal amplitudes, wherein the second echo train comprises a plurality of second NMR echo signal amplitudes, and wherein the duration of one of the first acquisition window and the second acquisition window is selected to optimize a signal-to-noise ratio of the first NMR echo signal amplitudes or the second NMR echo signal amplitudes, respectively.

A fifteenth embodiment, which is a non-transitory, computer-readable medium containing instructions that, when executed by a processor, cause the processor to be configured to: determine a first echo train based on a plurality of spin echo waveforms acquired from a volume in a subterranean region, wherein the first echo train is determined using a first acquisition window having a first duration; determine a second echo train based on at least some of the plurality of spin echo waveforms, wherein the second echo train is determined using a second acquisition window having a second duration, wherein the second duration is different than the first duration; and perform a single inversion on the first and second echo trains to determine a relaxation parameter.

A sixteenth embodiment, which is the non-transitory, computer-readable medium of the fifteenth embodiment, wherein the single inversion comprises fitting an expression to the first and second echo trains, wherein the expression comprises the relaxation parameter and a motion parameter.

A seventeenth embodiment, which is the non-transitory, computer-readable medium of the fifteenth embodiment, wherein the instructions, when executed by the processor, cause the processor to be further configured to: receive, from an accelerometer, acceleration data of the NMR tool; and determine a lateral displacement of the NMR tool as a function of time based on the acceleration data.

An eighteenth embodiment, which is the non-transitory, computer-readable medium of the fifteenth embodiment, wherein the first acquisition window and the second acquisition window are substantially symmetric with respect to a center of the spin echo waveforms.

A nineteenth embodiment, which is the non-transitory, computer-readable medium of the fifteenth embodiment, wherein the first acquisition window begins at a first time relative to a particular spin echo waveform, and wherein the second acquisition window begins approximately at the first time.

A twentieth embodiment, which is the non-transitory, computer-readable medium of the fifteenth embodiment, wherein the first echo train comprises a plurality of first NMR echo signal amplitudes, wherein the second echo train comprises a plurality of second NMR echo signal amplitudes, and wherein the duration of one of the first acquisition window and the second acquisition window is selected to optimize a signal-to-noise ratio of the first NMR echo signal amplitudes or the second NMR echo signal amplitudes, respectively.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Use of the term "optionally" with respect to any element of a claim is intended to mean that the subject element may be present in some embodiments and not present in other embodiments. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A nuclear magnetic resonance (NMR) tool for use in a wellbore in a subterranean region, the NMR tool comprising:
    a magnet assembly configured to produce a magnetic field in a volume in the subterranean region;
    an antenna assembly configured to produce an excitation in the volume, and to receive a plurality of spin echo waveforms from the volume; and
    a computing system coupled to the antenna assembly and configured to:
        apply a first acquisition window having a first duration to each of the plurality of spin echo waveforms to generate a corresponding first plurality of NMR echo signal amplitudes, wherein a first echo train comprises the first plurality of NMR echo signal amplitudes;
        apply a second acquisition window having a second duration, wherein the second duration is different than the first duration, to at least some of the plurality of spin echo waveforms to generate a corresponding second plurality of NMR echo signal amplitudes, wherein a second echo train comprises the second plurality of NMR echo signal amplitudes; and
        determine a relaxation parameter based on a single inversion of the first and second echo trains; and
        model a physical property of the subterranean region based on the relaxation parameter.

2. The NMR tool of claim 1, wherein the single inversion comprises fitting an expression to the first and second echo trains, wherein the expression comprises the relaxation parameter and a motion parameter that is separate from the relaxation parameter, wherein the motion parameter is indicative of lateral motion of the NMR tool.

3. The NMR tool of claim 1, further comprising an accelerometer configured to generate acceleration data of the NMR tool, wherein the computing system is further configured to receive acceleration data from the accelerometer, and to use the acceleration data to determine a lateral displacement of the NMR tool as a function of time.

4. The NMR tool of claim 1, wherein the first acquisition window and the second acquisition window are substantially symmetric with respect to a center of the spin echo waveforms.

5. The NMR tool of claim 1, wherein the first acquisition window begins at a first time relative to a particular spin echo waveform, and wherein the second acquisition window begins approximately at the first time.

6. The NMR tool of claim 5, wherein the particular spin echo waveform is acquired responsive to a first radio frequency (RF) pulse provided to the volume, and wherein at least one of the first acquisition window and the second acquisition window extends substantially to, but ends prior to, a closest subsequent RF pulse.

7. The NMR tool of claim 1, wherein the duration of one of the first acquisition window and the second acquisition window is selected to optimize a signal-to-noise ratio of the first NMR echo signal amplitudes or the second NMR echo signal amplitudes, respectively.

8. A method for using a nuclear magnetic resonance (NMR) tool in a wellbore in a subterranean region, the method comprising:
    determining a first echo train based on a plurality of spin echo waveforms acquired from a volume in the subterranean region, wherein the first echo train is determined using a first acquisition window having a first duration;
    determining a second echo train based on at least some of the plurality of spin echo waveforms, wherein the second echo train is determined using a second acquisition window having a second duration, wherein the second duration is different than the first duration;
    performing a single inversion on the first and second echo trains to determine a relaxation parameter; and
    modeling a physical property of the subterranean region based on the relaxation parameter.

9. The method of claim 8, wherein the single inversion comprises fitting an expression to the first and second echo trains, wherein the expression comprises the relaxation parameter and a motion parameter that is separate from the relaxation parameter, wherein the motion parameter is indicative of lateral motion of the NMR tool.

10. The method of claim 8, further comprising:
    receiving, from an accelerometer, acceleration data of the NMR tool; and
    determining a lateral displacement of the NMR tool as a function of time based on the acceleration data.

11. The method of claim 8, wherein the first acquisition window and the second acquisition window are substantially symmetric with respect to a center of the spin echo waveforms.

12. The method of claim 8, wherein the first acquisition window begins at a first time relative to a particular spin echo waveform, and wherein the second acquisition window begins approximately at the first time.

13. The method of claim 12, wherein the particular spin echo waveform is acquired responsive to a first radio frequency (RF) pulse provided to the volume, and wherein at least one of the first acquisition window and the second acquisition window extends substantially to, but ends prior to, a closest subsequent RF pulse.

14. The method of claim 8, wherein the first echo train comprises a plurality of first NMR echo signal amplitudes, wherein the second echo train comprises a plurality of second NMR echo signal amplitudes, and wherein the duration of one of the first acquisition window and the second acquisition window is selected to optimize a signal-to-noise ratio of the first NMR echo signal amplitudes or the second NMR echo signal amplitudes, respectively.

15. A non-transitory, computer-readable medium containing instructions that, when executed by a processor, cause the processor to be configured to:
    determine a first echo train based on a plurality of spin echo waveforms acquired from a volume in a subterranean region, wherein the first echo train is determined using a first acquisition window having a first duration;
    determine a second echo train based on at least some of the plurality of spin echo waveforms, wherein the second echo train is determined using a second acquisition window having a second duration, wherein the
second duration is different than the first duration;
perform a single inversion on the first and second echo
trains to determine a relaxation parameter; and
model a physical property of the subterranean region
based on the relaxation parameter.

16. The non-transitory, computer-readable medium of claim 15, wherein the single inversion comprises fitting an expression to the first and second echo trains, wherein the expression comprises the relaxation parameter and a motion parameter that is separate from the relaxation parameter, wherein the motion parameter is indicative of lateral motion of a nuclear magnetic resonance (NMR) tool.

17. The non-transitory, computer-readable medium of claim 15, wherein the instructions, when executed by the processor, cause the processor to be further configured to:
receive, from an accelerometer, acceleration data of the NMR a nuclear magnetic resonance (NMR) tool; and
determine a lateral displacement of the NMR tool as a function of time based on the acceleration data.

18. The non-transitory, computer-readable medium of claim 15, wherein the first acquisition window and the second acquisition window are substantially symmetric with respect to a center of the spin echo waveforms.

19. The non-transitory, computer-readable medium of claim 15, wherein the first acquisition window begins at a first time relative to a particular spin echo waveform, and wherein the second acquisition window begins approximately at the first time.

20. The non-transitory, computer-readable medium of claim 15, wherein the first echo train comprises a plurality of first nuclear magnetic resonance (NMR) echo signal amplitudes, wherein the second echo train comprises a plurality of second NMR echo signal amplitudes, and wherein the duration of one of the first acquisition window and the second acquisition window is selected to optimize a signal-to-noise ratio of the first NMR echo signal amplitudes or the second NMR echo signal amplitudes, respectively.

* * * * *